US009380016B2

(12) United States Patent
Vastardis et al.

(10) Patent No.: US 9,380,016 B2
(45) Date of Patent: Jun. 28, 2016

(54) SOCIAL NETWORK INFORMATION SYSTEM AND METHOD

(71) Applicant: Vineloop, LLC, Moorestown, NJ (US)

(72) Inventors: Lou Vastardis, Moorestown, NJ (US); Darren Pulito, Moorestown, NJ (US)

(73) Assignee: Vineloop LLC, Moorestown, NJ (US)

( * ) Notice: Subject to any disclaimer, the term of this patent is extended or adjusted under 35 U.S.C. 154(b) by 485 days.

(21) Appl. No.: 13/744,714

(22) Filed: Jan. 18, 2013

(65) Prior Publication Data

US 2013/0151639 A1   Jun. 13, 2013

Related U.S. Application Data

(63) Continuation of application No. 13/625,984, filed on Sep. 25, 2012, now abandoned.

(60) Provisional application No. 61/539,235, filed on Sep. 26, 2011.

(51) Int. Cl.
  *G06F 15/173* (2006.01)
  *H04L 12/58* (2006.01)
  *G06Q 30/02* (2012.01)
  *G06Q 50/00* (2012.01)

(52) U.S. Cl.
  CPC ............ *H04L 51/32* (2013.01); *G06Q 30/0241* (2013.01); *G06Q 50/01* (2013.01)

(58) Field of Classification Search
  CPC ....................... G06Q 30/0631; H04N 21/4826
  USPC ........................................................ 709/223
  See application file for complete search history.

(56) References Cited

U.S. PATENT DOCUMENTS

| | | | |
|---|---|---|---|
| 2009/0157486 A1* | 6/2009 | Gross | 705/10 |
| 2009/0254931 A1* | 10/2009 | Pizzurro et al. | 725/5 |
| 2011/0302117 A1* | 12/2011 | Pinckney et al. | 706/12 |
| 2012/0116915 A1* | 5/2012 | Zheng | 705/26.7 |
| 2012/0226698 A1* | 9/2012 | Silvestre et al. | 707/741 |
| 2013/0054695 A1* | 2/2013 | Holman et al. | 709/204 |
| 2013/0339179 A1* | 12/2013 | Pickelsimer | 705/26.7 |
| 2014/0180825 A1* | 6/2014 | Ramer et al. | 705/14.64 |
| 2014/0324624 A1* | 10/2014 | Ward et al. | 705/26.7 |

* cited by examiner

*Primary Examiner* — Phuoc Nguyen
(74) *Attorney, Agent, or Firm* — Riverside Law LLP

(57) ABSTRACT

The present invention is embodied in methods and system for obtaining information about a category of interest from a computer network, the computer network including a plurality of user networks with each user network including a plurality of users. The network further including an electronic database of information associated with the plurality of users.

16 Claims, 25 Drawing Sheets

| | | | Leisure | | |
|---|---|---|---|---|---|
| Primary Categories 275 | Restaurants Name/Title | Hotels Name/Title | Wine Name/Title | Beer Name/Title | Spirits Name/Title |
| Sub Categories 276 | Cuisine City Location Price | City Location Features Price | Vineyard Varietal Country Region Vintage Price Winemaker | Label Varietal Country Region Price Brewmaster | Maker Type Country |
| Standard Filters 277a | Rating Level Primary Category Sub Category Degrees of Separation from Expert Geography/Proximity to Product | | | | |
| Advance (Index) Filters 277b | Expert Status (Trust) Quantity of Ratings/UGC (Experience) Community Approval Ratings (Like) | | | | |

| | | Entertainment | | |
|---|---|---|---|---|
| Movies Name/Title | Music Name/Title | Books Name/Title | TV Shows Name/Title | Video Games Name/Title |
| Genre Actors Directors Producers | Artist Album Genre | Genre Author Publisher | Genre Actors Producers | Genres Platform Publisher |
| Rating Level Primary Category Sub Category Degrees of Separation fromExpert Geography/Proximity to Product | | | | |
| Expert Status (Trust) Quantity of Ratings/UGC (Experience) Community Approval Ratings (Like) | | | | |

FIG. 2B

A person has five people they trust most turned on = 5 total Trustlines
Each of those people have five trusted resources turned on
= 30 total Trustlines
Each of those people have five trusted resources turned on
= 155 total Trustlines
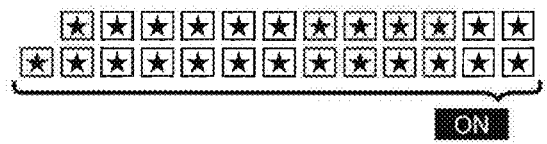
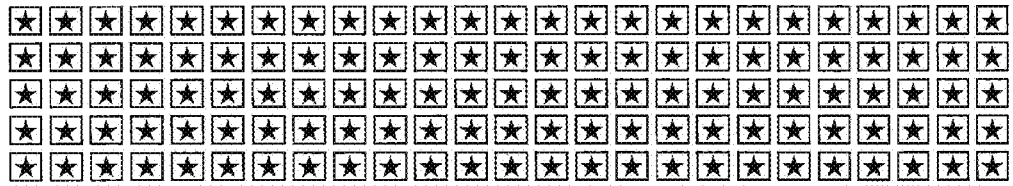
FIG. 6

|  | Measure | Target |
|---|---|---|
| Acquisition | | |
| Account sign up | # New account registration/invites | x registrations / week |
| Loop invitations (total) | # Loop invites sent | x invitations sent / week |
| Loop invitations (average) | # Loop invites sent / per user | x invitations sent / week |
| New relationships (total) | # Loop invite conversion | x invitations accepted & reg / week |
| New relationships (average) | # Loop invite conversion | x invitations accepted & reg / week |
| Organic reg (if applicable to model) | # new users without invite | x new users without invite / week |
| Registration fallout (total) | # visitors vs. completed reg | x visits to reg abandoned / week |
| Registration fallout (if applicable to model) | # visitors vs. completed reg | x visits to reg abandoned / week |
| Category Development | | |
| Category activation (establishment rating, trustline or following) | % of user base that has activated category, per category | x visits / week in x category |
| Category visits | # visits per category | x visits / week in x category |
| Category ratings | # ratings per category | x ratings / week in x category |
| Trust Graph development | | |
| Category trustlines status | Avg. # of ON trustlines | x trustlines per user |
| Category trustlines ON status per category | Avg. # of ON trustlines, per category | x trustlines per user, per category |
| Average users trustline size | # ON trustlines: 1st, 2nd, 3rd degree, per category | x ON trustlines 1st, 2nd, 3rd degree, per category |
| Category trustline change (ON) 1st degree, per category | % change in trustlines turned ON, per category | x % change in trustlines turned ON, per category |
| Category trustline change (OFF) 1st degree, per category | % change in trustlines turned OFF, per category | x % change in trustlines turned OFF, per category |
| Category trustline change (OFF) 2nd or 3rd degree, per category | % change in trustlines turned OFF, per category | x % change in trustlines turned OFF, per category |
| Trustline endurance | Avg. # days a trustline remains ON | x # days a trustline remains ON |
| Trustline endurance per category | Avg. # days a trustline remains ON, per category | x # days a trustline remains ON, per category |
| No trustlines | # users with no trustlines | x users with no trustlines |
| No trustlines, per category | # users with no trustlines, per category | x users with no trustlines, per categories |

FIG. 16A

| Engagement | | |
|---|---|---|
| Total ratings consumed | # ratings read per visit | x ratings read / per week (visit?) |
| Ratings consumed per category | # ratings read per category, per visit | x ratings read / per week (visit?) |
| Ratings consumed per the VLP INDEX channel, per category | # ratings read per category, per channel, per visit | x ratings read / per week (visit?) |
| Ratings consumed per the FOLLOWING channel, per category | # ratings read per category, per channel, per visit | x ratings read / per week (visit?) |
| Ratings consumed per the LOOPED channel, per category | # ratings read per category, per channel, per visit | x ratings read / per week (visit?) |
| Ratings consumed per the TRUSTLINE channel, per category | # ratings read per category, per channel, per visit | x ratings read / per week (visit?) |
| Ratings consumed at 2nd degree | # ratings read per visit, per category, per trustline level | x ratings read / per week (visit?) |
| Ratings consumed at 3rd degree | # ratings read per visit, per category, per trustline level | x ratings read / per week (visit?) |
| Total ratings created | # ratings created per visit | x ratings read / per week (visit?) |
| Ratings created per category | # ratings read per category, per visit | x ratings read / per week (visit?) |
| Ratings creation frequency | # (avg.) time since lat rating | x days (avg.) since last rating |
| Ratings creation frequency per category | # (avg.) time since lat rating, per category | x days (avg.) since last rating |

FIG. 16B

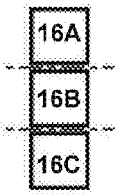

| Conversion | | |
|---|---|---|
| Users Pocketing | # total items in pockets | x items in all pockets |
| Items pocketed per category | # total items in pockets, per category | x items in all pockets, per category |
| Items Pocketed | # items pocketed per visit | x items pocketed / per week (visit?) |
| Items pocketed per the VLP INDEX channel, per category | # items pocketed per category, per channel, per visit | x items pocketed / per week (visit?) |
| Items pocketed per the FOLLOWING channel, per category | # items pocketed per category, per channel, per visit | x items pocketed / per week (visit?) |
| Items pocketed per the LOOPED channel, per category | # items pocketed per category, per channel, per visit | x items pocketed / per week (visit?) |
| Items pocketed per the TRUSTLINE channel, per category | # items pocketed per category, per channel, per visit | x items pocketed / per week (visit?) |
| Items pocketed at 2nd degree | # items pocketed per visit, per category, per trustline level | x items pocketed / per week (visit?) |
| Items pocketed at 3rd degree | # items pocketed per visit, per category, per trustline level | x items pocketed / per week (visit?) |
| | | |
| Users buying recommendations (selected BUY items) | # total items bought | x items where BUY button was triggered |
| Items bought per category | # total items bought, per category | x items where the BUY button was triggered, per cat |
| Items bought per the VLP INDEX channel, per category | # items bought per category, per channel, per visit | x items where BUY button was triggered / per week (visit?) |
| Items bought per the FOLLOWING channel, per category | # items bought per category, per channel, per visit | x items where BUY button was triggered / per week (visit?) |
| Items bought per the LOOPED channel, per category | # items bought per category, per channel, per visit | x items where BUY button was triggered / per week (visit?) |
| Items bought per the TRUSTLINE channel, per category | # items bought per category, per channel, per visit | x items where BUY button was triggered / per week (visit?) |
| Items bought at 2nd degree | # items bought per visit, per category, per trustline level | x items where BUY button was triggered / per week (visit?) |
| Items bought at 3rd degree | # items bought per visit, per category, per trustline level | x items where BUY button was triggered / per week (visit?) |
| Return / Stickiness | | |
| Frequency of usage | # days since last login | x visits / month (day?) |

FIG. 16C

SOCIAL NETWORK INFORMATION SYSTEM AND METHOD

CROSS-REFERENCE TO RELATED APPLICATIONS

This application is a continuation of U.S. patent application Ser. No. 13/625,984, filed Sep. 25, 2012, which claims priority to U.S. Provisional Patent Application Ser. No. 61/539,235, filed Sep. 26, 2011, entitled Social Network Information System and Method, the entireties of which are expressly incorporated herein by reference in their entireties.

BACKGROUND OF THE INVENTION

Social networking websites, such as those hosted on Facebook™ and Yahoo!™, provide network services to facilitate interaction between users. Typically, users who sign up for these services are able to establish connections with other users. As the popularity of such network services has increased, many social networking websites service millions of users with many individual users having large networks that include hundreds or even thousands of connections to other users.

Users of such network services may be interested not only in requesting information or assistance from other users with whom they have established a connection, or with whom they don't have an established connection, but moreso in requesting information from other users they can trust regarding the topic for which the information is sought. The development of systems and methods for users of such network services to request and retrieve relevant and trusted information from other users within a social network would be useful to users.

Thus, the need exists for an apparatus, system and method for providing networking services through which a user can build communication lines to gain relevant, trusted information, by topic, from contacts and contacts of contacts.

SUMMARY OF THE INVENTION

The present invention is embodied in methods and system for obtaining information about a category of interest from a computer network, the computer network including a plurality of user networks with each user network including a plurality of users. The network further including an electronic database of information associated with the plurality of users.

The method includes receiving an information request from a user, the information request specifying a category, identifying a first set of one or more users within a user network of the user, each user in the first set associated with the category and established as a trusted information resource contact of the user for the category, identifying a second set of one or more users within a user network of one or more users of the first set, each user in the second set associated with the category and established as a trusted information resource contact of the one or more trusted information resource contacts of the first set for the category, retrieving information associated with the one or more trusted information resource contacts of the identified second set from the electronic database corresponding to the information request, and providing the retrieved information to the user. The steps of the method may be embodied in computer executable instructions stored on a non-transient machine readable medium that cause a server to perform the method when executed by the server.

The system includes an electronic database of information and a server. The server is configured to receive an information request from a user, the information request specifying a category, identify a first set of one or more users within a user network of the user, each user in the first set associated with the category and established as a trusted information resource contact of the user for the category, identify a second set of one or more users within a user network of one or more users of the first set, each user in the second set associated with the category and established as a trusted information resource contact of the one or more trusted information resource contacts of the first set for the category, retrieve information associated with the one or more trusted information resource contacts of the identified second set from the electronic database corresponding to the information request, and provide the retrieved information to the user.

BRIEF DESCRIPTION OF THE DRAWINGS

The invention is best understood from the following detailed description when read in connection with the accompanying drawings, in which like elements may have the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bidirectional exchange between these components. Included in the drawings are the following figures:

FIG. 2B is a table depicting exemplary categories and sub-categories for use with the present invention;

FIG. 6 is a hierarchical diagram illustrating aspects of the present invention;

FIGS. 16A, 16B, and 16C are a database illustration of aspects of the present invention.

DETAILED DESCRIPTION OF THE INVENTION

Figure 1:
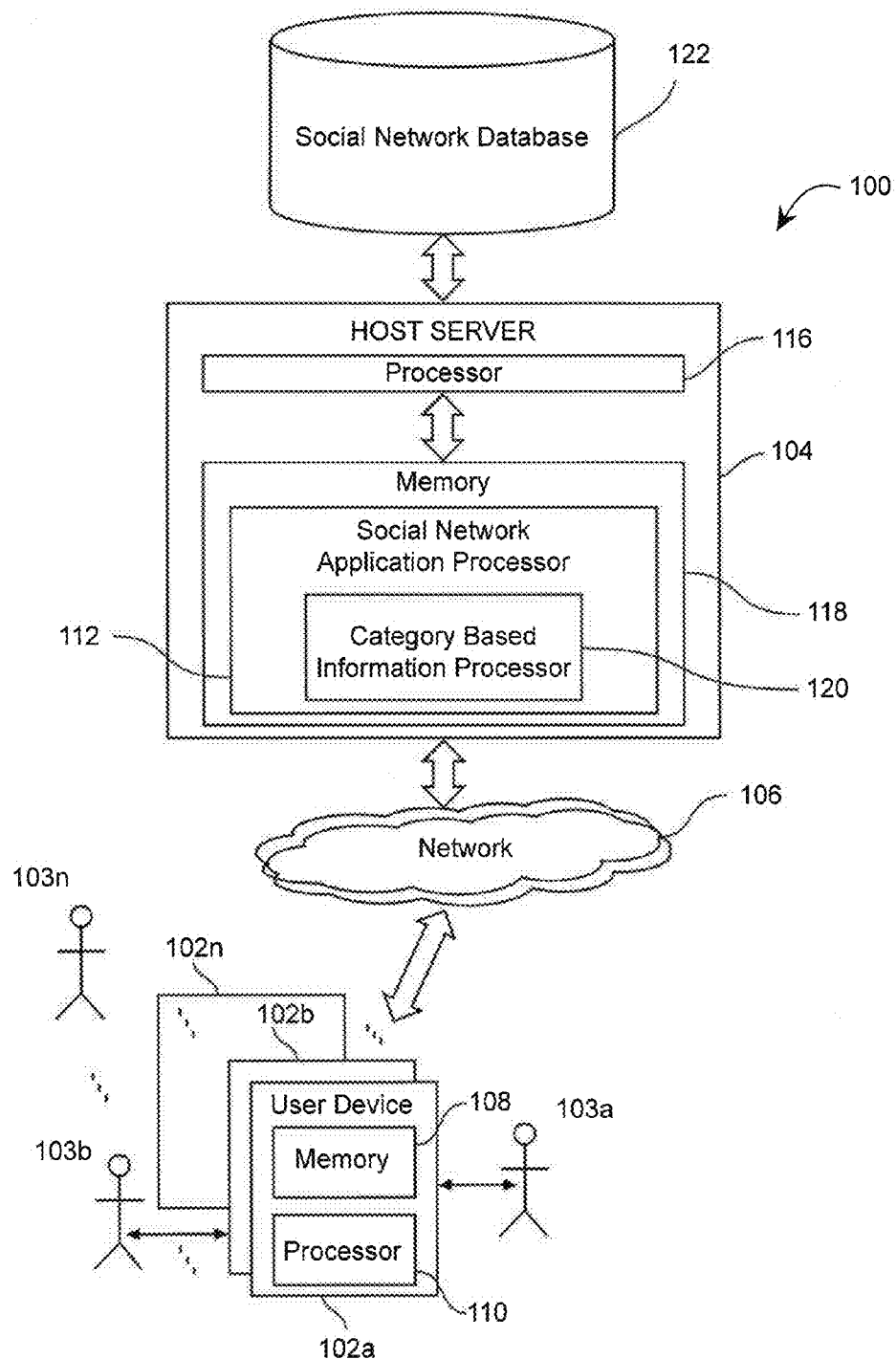
FIG. 1 is a system diagram depicting an exemplary system in accordance with aspects of the present invention.

It is to be understood that the figures and descriptions of the present invention have been simplified to illustrate elements that are relevant for a clear understanding of the present invention, while eliminating, for the purposes of brevity, many other elements found in typical networked applications, apparatuses, systems and methods. Those of ordinary skill in the art will thus recognize that other elements may be desirable and/or required in order to implement the present invention. However, because such elements are well known in the art, and because they do not facilitate a better understanding of the present invention, a discussion of such elements is not provided herein.

The inventors have recognized that the growing adoption of social media is creating a growing state of diminished utility for users. As the current social media products are establishing an increasing number of relationships, a state of information overload is beginning to occur. The reason is that the current social media models fail to address users' true passions, how they learn, and why they try or buy. The inventors have further recognized that users are most strongly influenced by small numbers of individuals with whom they have trusting interpersonal relationships. Thus, absent the addition of further trusted persons, larger social circles or social networks do not translate into improved social utility. An aspect of the present invention provides a system that supports the natural human tendency for learning and changing behavior; a system that is rooted in how individual users naturally seek out trusted information resources to provide them with what they deem as valuable information. The system extends the existence of an individual user's relationship beyond her immediate circle of contacts by perpetuating "trusted" knowledge sharing, category-based networks extending from her existing social networks.

Embodiments of the present invention allow a user of a social network to request information from other users. The information request can include, for example, a question for dissemination to other users, a search request for information maintained in an electronic database, and/or an alert request for information once it is added to the database. In an exemplary embodiment, a user builds one or more category-based networks based on categories she has in common with other network users (e.g., investing, wine, fitness regiments, book-types, movie-types, restaurants, music-types, etc). Users are then able to establish a select number of users within each category-based network as trusted information resource contacts (hereinafter also referred to as "TIRCs", e.g., other users that the first user trusts most within a specific category and/or from which the first user desires to receive rating information). In doing so, users are able to filter valuable, user-generated content (hereinafter also referred to as "UGC," which may include questions and answers, reviews, ratings, and recommendations) from a network of trusted resources (e.g., other users the first user may view as experts), which network, or "line," of trusted users may include the user's established TIRCs, the user's established TIRCs' TIRCs, etc.

FIG. 1 is a diagram illustrating an illustrative system 100 in which exemplary embodiments of the present invention may operate. The system 100 includes multiple user devices 102a-n in communication with a host server 104 over a network 106 such as the Internet, an intranet, a wide area network (WAN), a local area network (LAN), or other communication network capable of transporting data. Through user devices 102a-n, users 103a-n can communicate over the network 106 with each other and with other systems and devices coupled to the network 106.

Each of the user devices 102 includes memory 108 and a processor 110 such as a microcontroller, microprocessor, an application specific integrated circuit (ASIC), and/or a state machine coupled to the memory 108. Memory 108 may be a conventional computer-readable medium, such as a random access memory (RAM). In an exemplary embodiment, processor 110 executes computer-executable program instructions stored in memory 108. Suitable memory 108 and processors 110 will be understood by one of skill in the art from the description herein.

User devices 102a-n may also include a number of input/output (ID) devices (not shown) such as a mouse, a CD-ROM, DVD, a keyboard, a display, or other input or output devices. Exemplary user devices 102 include personal computers, digital assistants, personal digital assistants, cellular phones, mobile phones, smart phones, pagers, digital tablets, laptop computers, Internet appliances, and processor-based devices. In general, a user device 102a may be any type of device capable of communication with a network 106 and of interaction with one or more application programs. In an exemplary embodiment, user devices 102a-n may operate on any operating system capable of supporting a browser or browser-enabled application, such as Microsoft® Windows®. The user devices 102a-n shown include, for example, personal computers executing a browser application program such as Microsoft Corporation's Internet Explorer™.

The illustrated host server 104 includes a processor 116 and a memory 118. In an exemplary embodiment, processor 116 executes a social network application program (SNAP) 112 stored in memory 118. SNAP 112 allows users, such as user 103a, to interact with and participate in a computer-based social network (herein "social network"). A social network can refer to a computer network connecting users, such as people or organizations. An example of a social network in which the present invention may be implemented is Facebook™. As defined herein, the SNAP may have one or more aspects operating as a "thin client," i.e., operating as an application remote from user device 102, and/or may have one or more aspects operating as a "thick client," i.e., operating as an application local to processor 110 of user device 102.

A social network may comprise user profiles that can be associated with other user profiles. Each user profile may represent a user and a user can be, for example, a person, an organization, a business, a corporation, a community, a fictitious person, an institution, information source, or other entity. Each profile can contain entries, and each entry can comprise information associated with a profile. Memory 118 may be a conventional computer-readable medium, such as a random access memory (RAM). In an exemplary embodiment, processor 116 executes computer-executable program instructions stored in memory 118. Suitable memory 118 will be understood by one of skill in the art from the description herein.

Host server 104, depicted as a single computer system, may be implemented as a network of computers and/or servers. Examples of a host server 104 are servers, mainframe computers, networked computers, processor-based devices, and similar types of systems and devices. Processor 110 and processor 116 can be any of a number of computer processors, such as processors from Intel Corporation of Santa Clara, Calif. and Motorola Corporation of Schaumburg, Ill., which will be understood by one of skill in the art from the description herein.

SNAP 112 can include a category-based information (hereinafter also referred to as "CBI") processor 120. CBI processor 120 may include, be included in, or may communicatively form a portion of, processor 110 and/or processor 116. In an exemplary embodiment, processor 120 enables a user 103 to establish trusted information resource contacts/relationships with other users that are based on categories and to request information from these TIRCs. Processor 120 can cause the display of information provided by one or more users 103 of the social network on a user device 102. Processor 120, in some embodiments, can generate, distribute, and/or update a search record. Multiple processors and other hardware can be provided to perform operations associated with embodiments of the present invention.

Host server 104 also provides access to electronic data storage elements, such as a social network storage element, In the example shown in FIG. 1, an electronic social network database 122, which may be stored in memory 118 of host server 104 or external to host server 104 as illustrated. The social network database 122 may be physically attached or otherwise in communication with the social network engine 112 by way of a network or other connection. The social network database 122 can be used to store users' member profiles, preferably including categorical TIRCs of those users. Electronic data storage elements may include any one or combination of methods for storing data, including without limitation, arrays, hash tables, lists, and pairs. Other similar types of data storage devices can be accessed by the host server 104. SNAP 112 can receive data comprising the user profiles from the social network database 122 and can also send data comprising user profiles to the social network database 122 for storage.

It should be noted that the present invention may comprise systems having different architecture than that which is shown in FIG. 1. For example, in some systems according to the present invention, host server 104 may comprise a single physical or logical server. The system 100 shown in FIG. 1 is merely exemplary, and is used to help explain the social network and adaptive rating systems and methods illustrated in the other figures discussed hereinthroughout.

Figure 2:
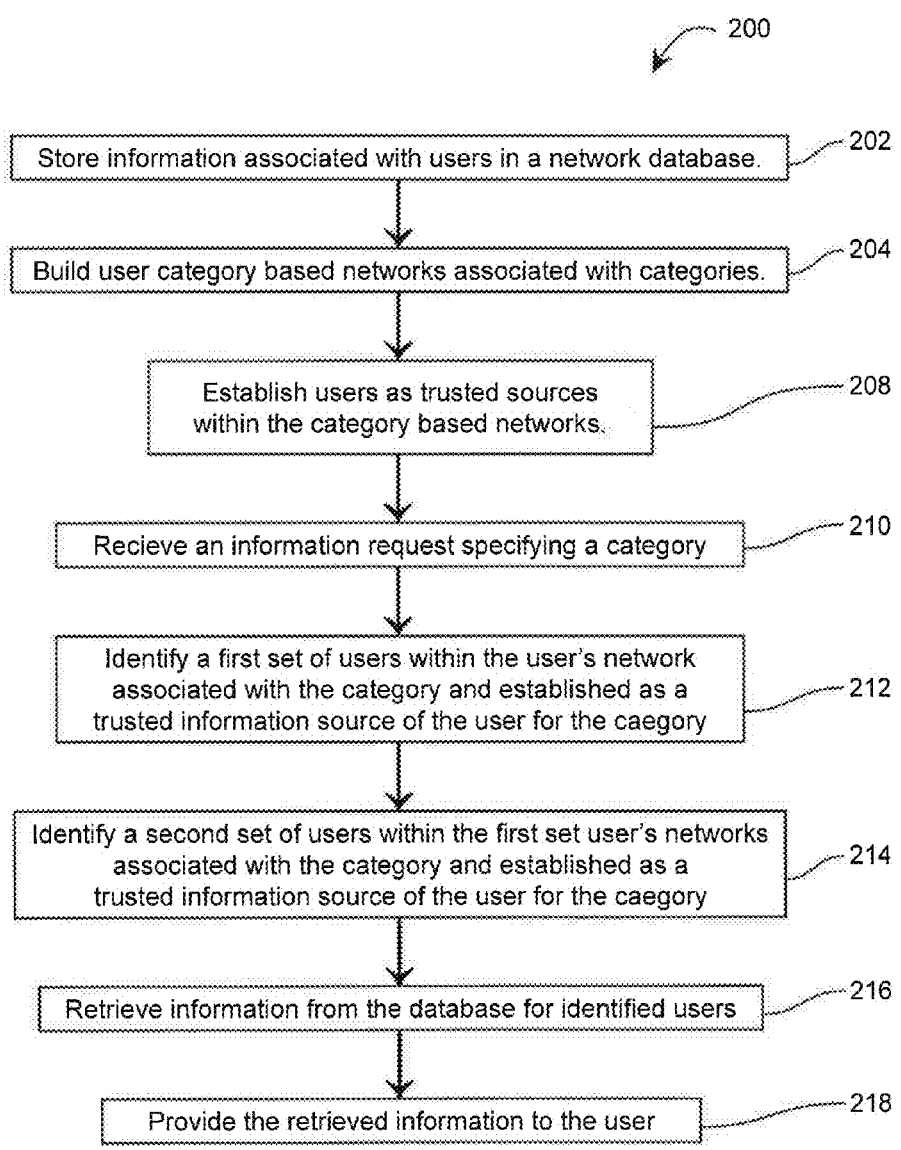
FIG. 2 is a flow chart depicting exemplary steps for requesting and retrieving information in accordance with aspects of the present invention.

FIG. 2 depicts a flow chart 200 of exemplary steps for retrieving information about a category of interest from a social network in accordance with aspect of the present invention. In an exemplary embodiment, the social network includes multiple user networks where each user network includes multiple users. The steps of flow chart 200 will be described with reference to the system 100 depicted in FIG. 1 to facilitate description. Other systems in which the steps of flow chart 200 may be carried out will be understood by one of skill in the art from the description herein.

At block 202, information associated with users may preferably be stored in one or more databases. In an exemplary embodiment, information generated by users 103 may be stored in social network database 122. The information may include ratings and reviews of products, answers to question links, or any other form of user-generated content (UGC). For example, the recommendations may include trusted recommendations for on-demand movies, and the like, available via cable or satellite television, which recommendations may be produced, such as via an IP set top box or an IP television, directly on the subject television of the viewer. All forms of information may be generated and stored by users of the social network prior to receiving a request for information. Additionally, information generated and stored after a request for information may be used to satisfy a standing request.

Figure 2A:
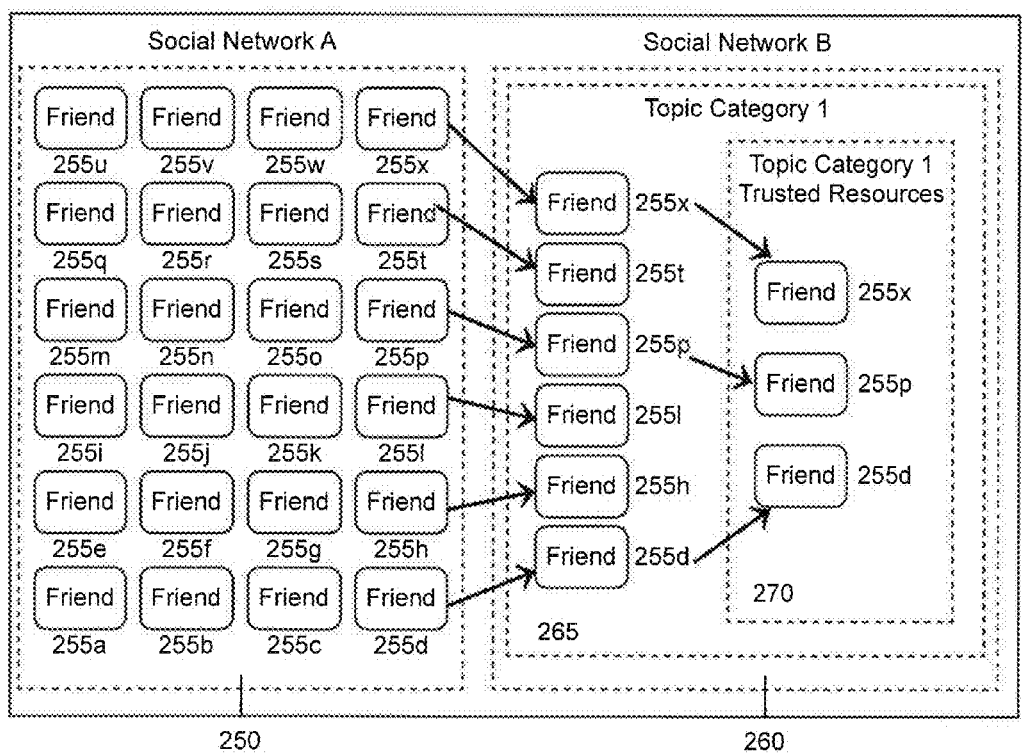
FIG. 2A is a block diagram illustrating the establishment of a category-based network and the establishment of trusted information resource contacts within the category-based network in accordance with an aspect of the present invention.

At block 204, user category-based networks associated with categories are built. FIG. 2a depicts an exemplary user network 250 including multiple contacts/friends 255a-x (24 contacts are shown in the illustrated embodiment) within a user's network. Contacts 255 of the user may be associated with a category such as a category or sub-category (described below) to build a category-based network. In the illustrated embodiment, contacts 255 x, t, p, l, h and d are associated with a category (e.g., wine) to build category-based network 265. Step 204 may be performed for every user 103 within social network database 122.

User category-based networks, such as category-based network 265, may be built based on the user associating one or more contacts 255 with a particular category 260. In an exemplary embodiment, the user may unilaterally assign contacts 255 to one or more category-based networks. For example, the host server 104 may create a graphical user interface (GUI) for display on a user device 102. The GUI may display each contact 250 of the user along with a series of check boxes corresponding to categories next to each user. The user may then simply select the appropriate check boxes to associate contacts with a category.

In an alternative exemplary embodiment, bilateral agreement may be necessary to establish a category-based network 265. For example, the host server 104 may create a GUI for display on a user device 102. The GUI may display each contact 255 of the user along with a series of check boxes corresponding to categories next to each user. Selection of category check boxes associated with a particular contact 255 may result in an email message to that contact requesting consent. The contact may then be associated with the category and become a member of the category-based network 265 upon a positive response to the consent request.

FIG. 2B depicts exemplary categories 275 and sub-categories 276 associated with particular categories with which users may be associated. The subcategories provide finer granularity for categorizing. For example, a category may be "wine" and a subcategory may be "varietal" (Cabernet, Merlot, Zinfandel, etc).

Figure 3:
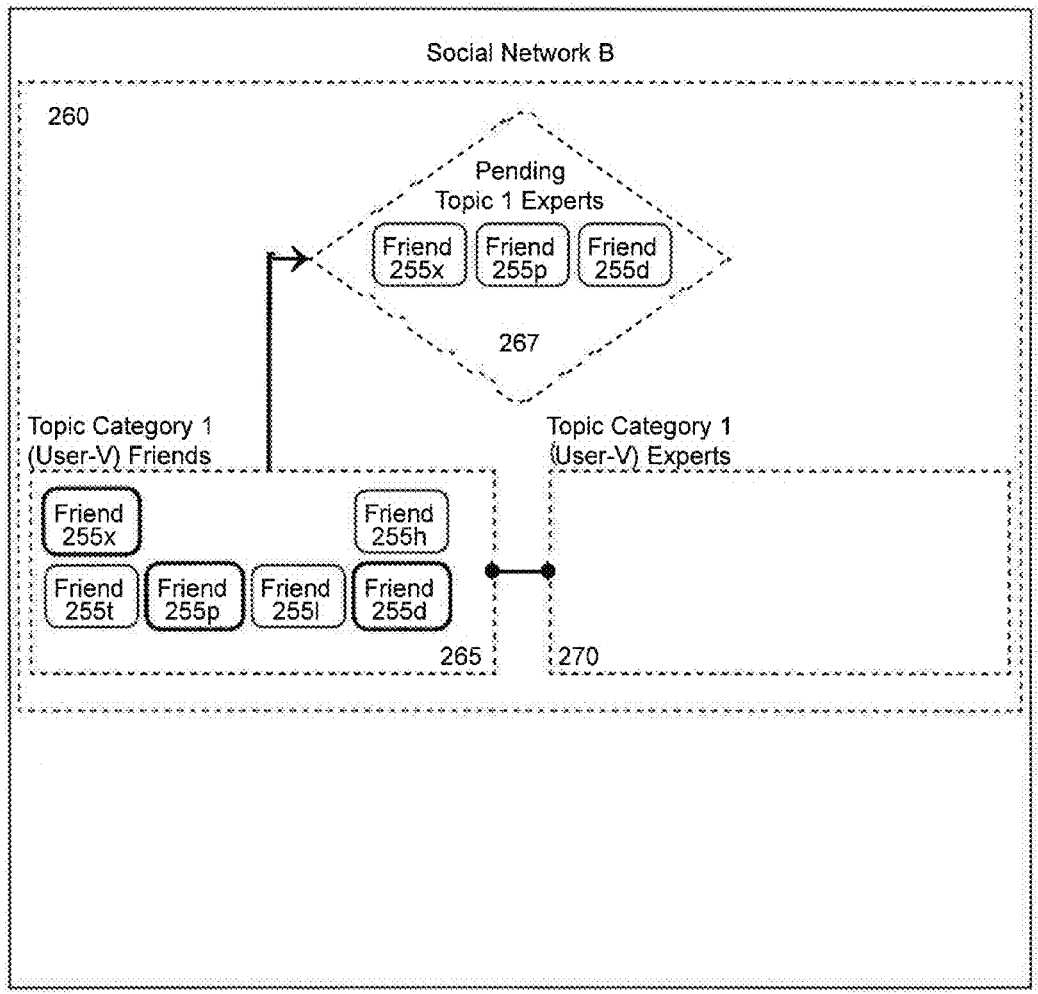
FIG. 3 is a block diagram illustrating a pending category trust request in accordance with aspects of the present invention.
Figure 3A:
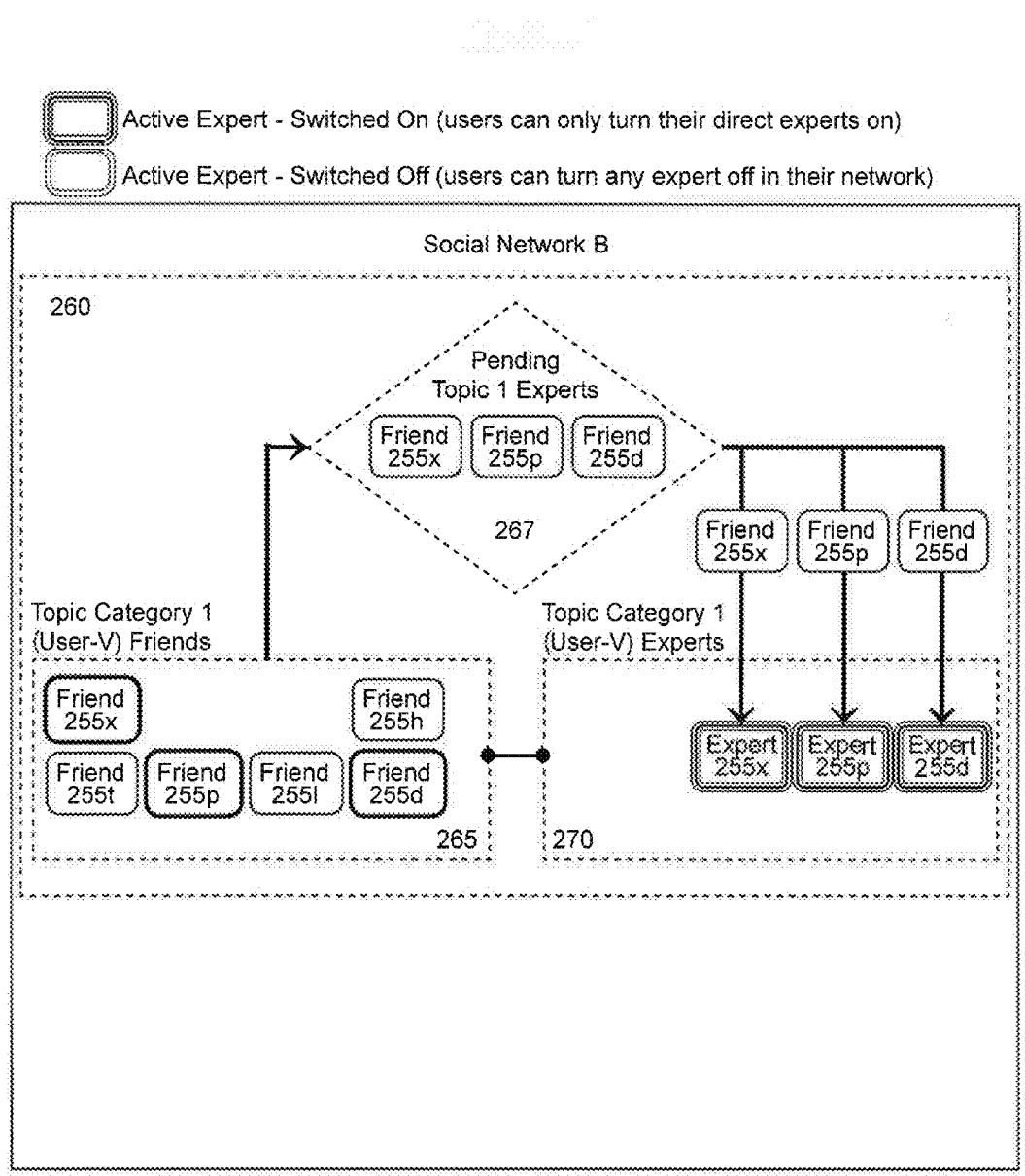
FIG. 3A is a block diagram illustrating established trusted information resource contacts of a user for a category in accordance with aspects of the present invention.

Referring now again to FIG. 2, at block 208, contacts are established as TIRCs (e.g., experts) from which the user desires to receive information. The TIRCs form a set 270 of one or more contacts 255 of the user that are associated with the category and are established as TIRCs of the user for that category. In an exemplary embodiment, the user sends a trusted information resource request to one or more contacts 255 for a category/subcategory requesting that those contacts become TIRCs of the user for that category/subcategory. For example, the user may send trusted information resource requests to three of the contacts 255 (e.g., contacts 255x, p, d) within category-based network 265 to become TIRCs of the user for the category/subcategory. The trusted information resource requests for the category are received by the host server 104, which forwards the trusted information resource requests to the intended contacts 255x, p, d and waits for a response. At this point, the trusted information resource requests are pending and a trusted information resource relationship has not been established, which is illustrated in FIG. 3. The host server 104 then establishes each user from which a positive response to the trusted information resource request is received as a TIRC of the user. FIG. 3A depicts the establishment of a set 270 of trusted information resource relationships between the user and contacts 255x, p, d for category-based network 265.

Figure 3B:
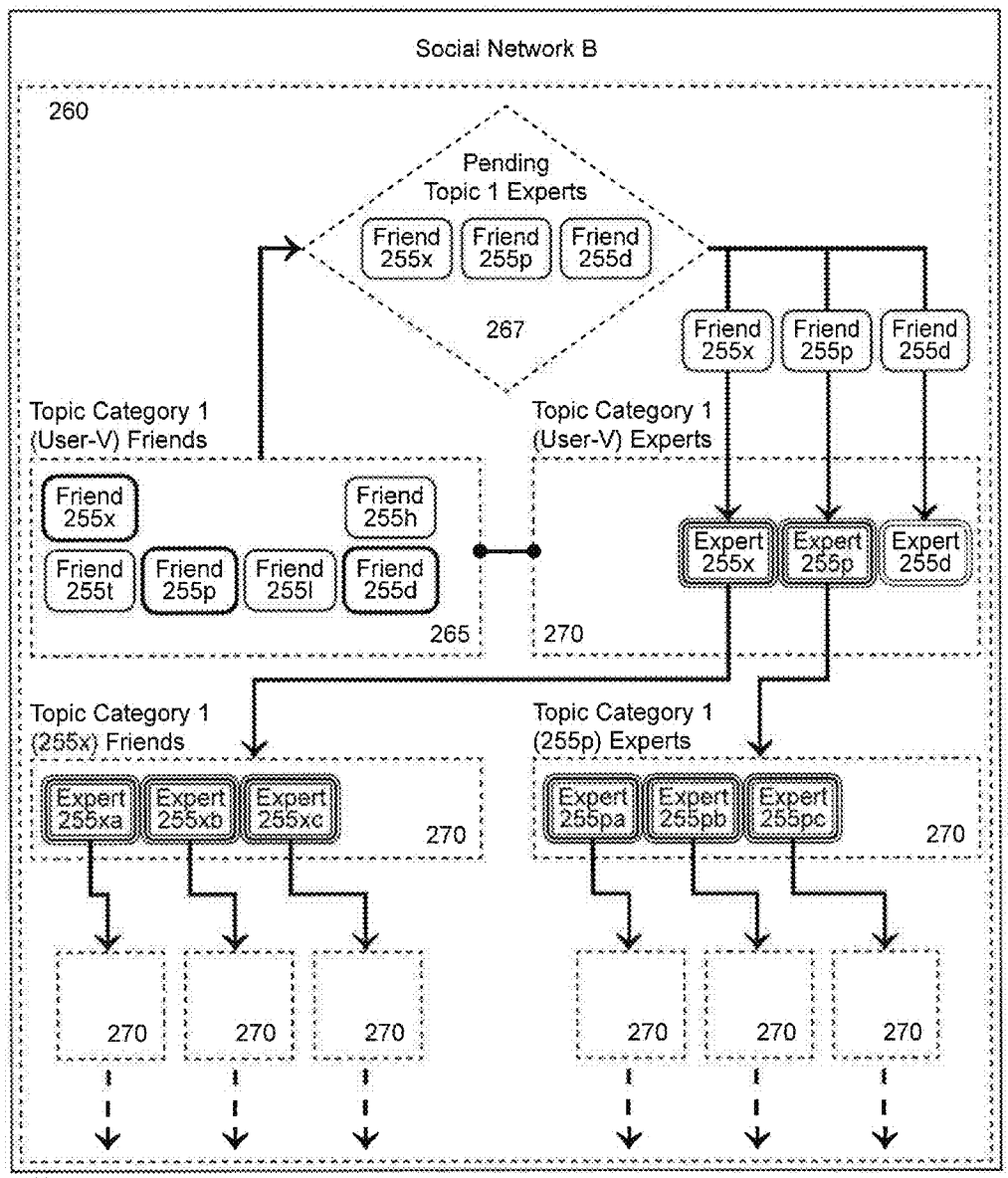
FIGS. 3B and 3C are block diagrams illustrating established trusted information resource contacts of established trusted information resource contacts in accordance with aspects of the present invention.

In an exemplary embodiment, once TIRCs are established, the user can individually turn the TIRCs on (active) and off (inactive) as desired. FIG. 3B illustrates the trusted connections between the user and contacts 255x and p turned on, and the trusted connection to expert 255d turned off. In this arrangement, the user is able to retrieve information from TIRCs 255x and 255p (but not 255d), and from the TIRCs with which contacts 255x and 255p have active trusted connections (e.g., 255xa, xb, xc and 255pa, pb, pc); and from the active TIRCs of contacts 255xa, xb, xc and 255pa, pb, pc, etc.

Figure 3C:
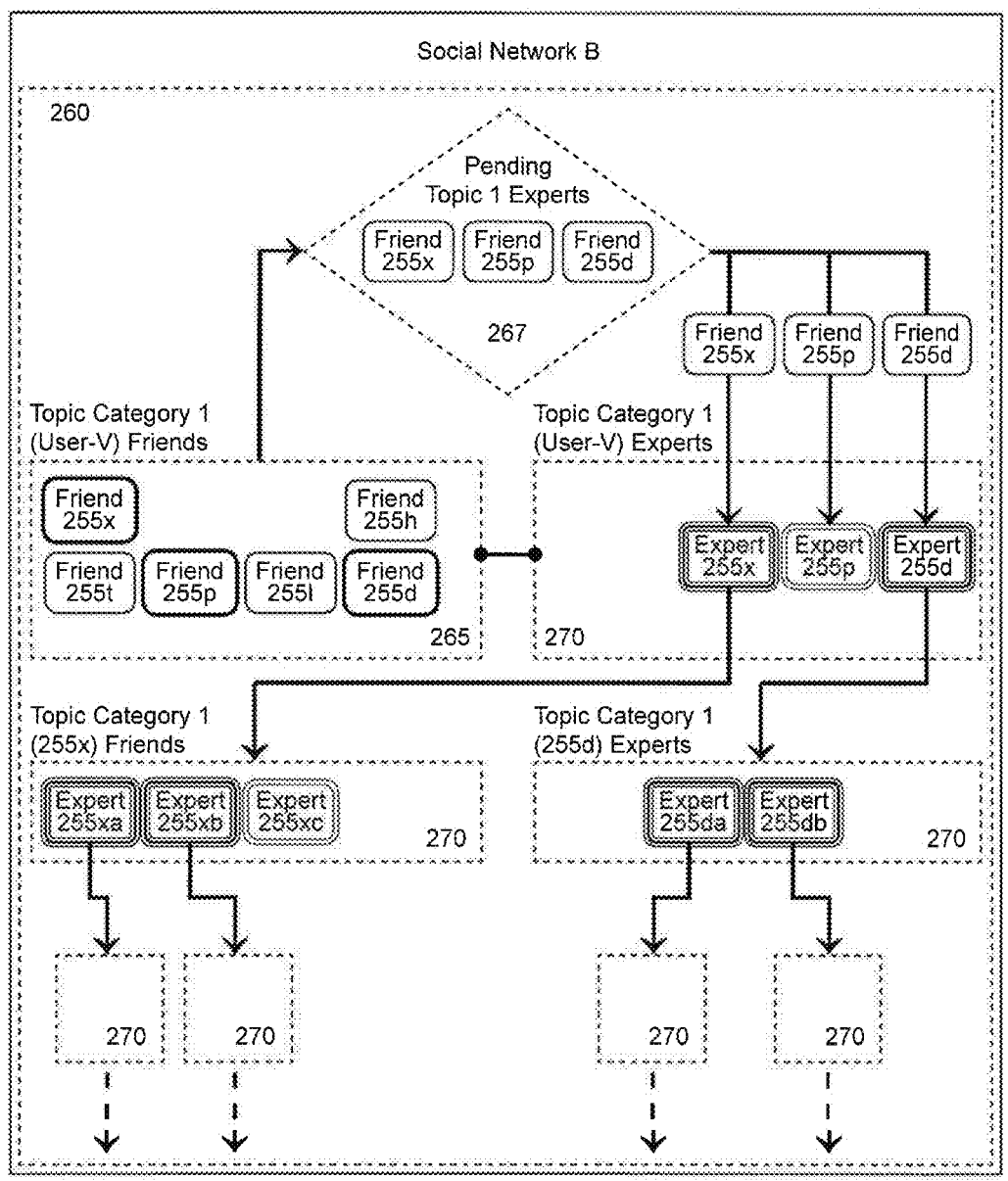

FIG. 3C illustrates the trusted connections between the user and contacts 255x and d turned on and the trusted connection to expert 255p turned off. In this arrangement, the user is able to retrieve information from TIRCs 255x and 255d (but not 255p), and from the TIRCs with which contacts 255x and 255d have active trusted connections (e.g., 255xa, xb, da, and db, but not 255xc); and from the active TIRCs of contacts 255xa, xb, da, and db. In an exemplary embodiment, a contact such as contact 255xc in FIG. 3C may be designated as inactive by the user with which that contact has a trusted information resource connection (e.g., by contact 255x for 255xc).

In an additional embodiment, to improve search results a user requesting the search may designate one or more TIRCs of their TIRCs as inactive for purposes of generating search results for queries by that user. For example, a user may designate contact 255xc as inactive if the user does not want results from that contact (e.g., does not trust that contact's recommendations based on past experience). In accordance with this embodiment, designation of a contact as inactive for the user's queries only renders that contact inactive from the user's viewpoint and does not render that contact inactive as a TIRC of other users (e.g., contact 255xc may remain an active TIRC of contact 255x for contact 255x and other users unless contact 255x designates contact 255xc as inactive.

The number of active TIRCs per category may be limited. In an exemplary embodiment, the number of active TIRCs per category is limited to ten or less and, more preferably, to three or less. Step 208 may be performed for every user 103 within social network database 122. TIRCs may thus be established by group/subject, and preferably may be established by users who themselves are trusted to assess TIRCs.

More particularly and in certain embodiments related to FIG. 2, a user may access, join and/or make use of prior groups created by prior users associated with available topics/subjects, including TIRC information associated with those prior groups, for example. In such instances, the subsequent user may have no way of knowing the value or level of trust a prior user had in the group or in formulating the group, that is, the subsequent user may have no way of knowing if the prior user was a TIRC, and/or if group created by the prior user consists of true TIRCs, i.e., the subsequent user may not know if the prior user that formulated the existing group had sufficient expertise to make reuse of the existing group by the subsequent user worthwhile.

Figure 4A:
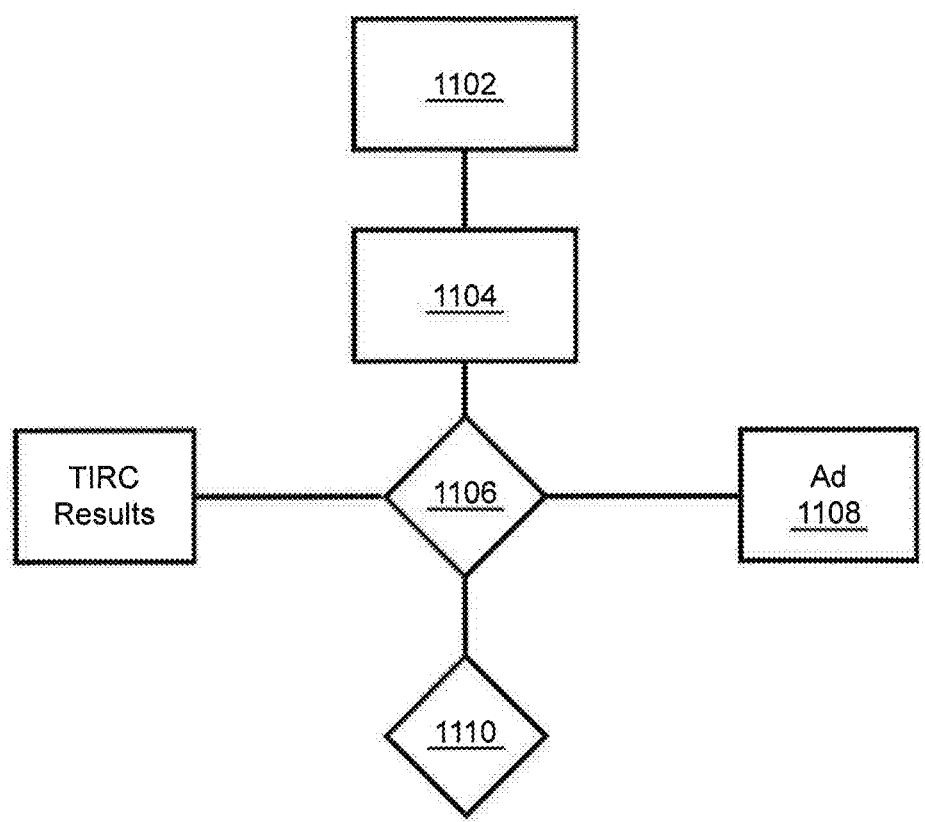
FIG. 4A is a flow diagram illustrating aspects of the present invention.

In such a case, the group, and/or a prior user or TIRC, may be "verified." Verification may occur, for example, in two ways, such as is illustrated in the flow diagram of FIG. 4A. First, at step 1102, the group itself may include at least one rating, or like reliability assessment, by a third party user, which may, for example, stem from the use of the group by a plurality of third party users. Second, at step 1104, a user may view the overall rating, reliability rating and/or utilization of the users, contacts, and/or TIRCs within the group. For example, in evaluating the group, the evaluating user may be able to view the number of groups (or number of other users) for which each user(s), contact(s), and/or TIRC(s) of the evaluated group is "active" (in embodiments wherein a user may be "active" or "inactive" as indicated by other users in the group), for example. The present invention may also allow each user(s), contact(s), and/or TIRC(s) to be rated by a user of the group—such rating may be a scaled rating, such as, for example, on a scale of 1-5, wherein 1 may be indicative of not helpful and 5 may indicate a high degree of expertise and/or trust, by way of non-limiting example. Further, a user may be asked whether to modify ratings upon entering new ratings for other users in the same category, as discussed elsewhere herein.

Moreover, a TIRC in a particular area is likely to have record of activity tracked or trackable by the present invention, such as a record of the TIRC's book marking, live-linking, or dedicating a page to particular links or points of interest that the TIRC believes are helpful or of a certain quality, for example. Thus, it may be more useful for a subsequent user to search for a TIRC or a TIRC's searching or tracked results, and then make use of the TIRC's recommended information or search points, such as at step 1106, than it is for the user who is a non-TIRC to formulate his or her own search or reuse a prior search that may or may not have been performed by a TIRC.

Additionally and alternatively, at least one TIRC in a particular field may advertise his/her expertise and/or rating within the present invention at step 1108, such as wherein the TIRC's expertise has been verified (as discussed above) by at least one user, or a trusted third party verifier, in the present invention. For example, a TIRC knowledgeable about the effects of different types of mortgages on an individual may be verified as a TIRC by other users making that TIRC active, by being deemed a TIRC by a requisite number of other users, or by being verified by the Association of Certified Public Accountants. A searching user may also search "advertisements," such as indications within a search result set of those deemed the foremost TIRCs on a searched topic, or keyword correspondent ads related to a keyword searched, wherein a TIRC has been verified with respect to that keyword and/or has requested that the TIRC be returned in search results associated with that keyword, in order to locate a known TIRC in a particular field.

Similarly, the present invention may allow for "super" TIRCs, i.e., the aforementioned TIRCs of a TIRC, at step 1110. More particularly, a TIRC may be deemed an expert among experts in a certain field, such as upon: being named a TIRC by one or a predetermined number of the members whom other users have named as TIRCs; being "active" as a TIRC in the topical area for one or a certain number of other TIRCs; being named by or "active" for a large number of users as a TIRC; or being verified by the engine of the present invention or a third party as a "super" TIRC, by way of non-limiting example. Likewise, a super-TIRC may use such status to "advertise," such as to engage in keyword sponsorships, and/or to offer endorsements for goods or services offered by users of the instant invention, and/or to improve the search result standings of such super-TIRCs within or outside the present invention, by way of non-limiting example.

A super-TIRC may be indicated by a trust rating, for example. More particularly, experts may be sorted, or ranked, such as on an exemplary scale of 1-5, wherein the expert ranked 1 is most likely the foremost expert in the relevant topic. As such, it is likely that the expert achieving the rank of "1" is also the, or one of the, super-TIRCs.

Thus, the present invention, at least in part, may provide searching based on the relevancy of a TIRC's expertise to a desired topic on which information is sought, rather than the prior art methodology of keyword searching relating not to people and/or experts, but instead relating merely to websites, things, or advertised services that have no expertise rating associated therewith. Of course, this embodiment of the present invention correspondingly allows for a keyword or sponsored keyword-based revenue model as used in prior art search engines and keyword advertising, such as is offered by Google®, to be employed in the monetization of status as a true TIRC in certain topical areas.

Figure 5:
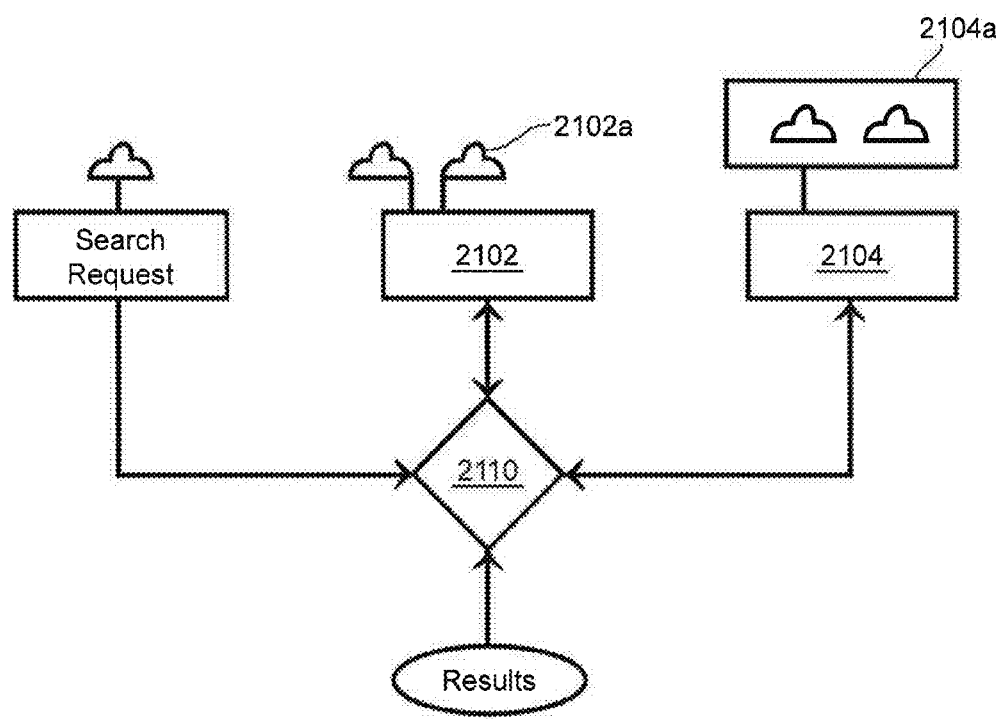
FIG. 5 is a flow diagram illustrating aspects of the present invention.

Accordingly, the present invention may interrelate keywords and expertise in those keywords, as illustrated in FIG. 5B. As will be apparent to those skilled in the art in light of this discussion, similarities among users 2102 and/or groups 2104 may increase the relevancy for keyword search results 2104, particularly in localized (such as geographic or topical localization) searching, and the advantages gained from this similarity are further heightened when one of the users wishes to gain from the expertise of a similar user 2102a, or a group 2104a of similar users, in the desired area 2110. Expertise-based keyword searching in such embodiments may be particularly useful in areas in which particularly unique expertise would have the greatest impact on improving search results. Such areas include, but are not limited to, geographic locality, travel, health, entertainment, cars, lifestyle, education and commerce, for example.

Additionally, for example, as will be understood by those skilled in the art in light of the discussion herein, in embodiments wherein the certain characteristics of a user may be known to the search engine of the present invention, the assembling of groups in accordance with the present invention may allow for a monitoring of what user(s), contact(s), and/or TIRC(s) are deemed trusted or most trusted, and which user(s), contact(s), and/or TIRC(s) the user deemed relevant or most relevant to particular subjects. Further, the present invention may monitor what was done responsive to that relevance, such as changing the composition of a particular group or status of a user(s), contact(s), and/or TIRC(s).

In an embodiment of the present invention, a user may agree to join a group for a particular subject, for example, may gain access to the users, contacts, and/or TIRCs within the group, and may avail to the other members of the group any information provided by that user. A "new" user to a group may be placed, such as automatically, in an "inactive" status, as that status is discussed above, and may thus be available in a group but not used within the ratings for the particular subject. Another user may thereafter activate inactive users, contacts, and/or TIRCs, and place at least one in the "active" group. As discussed, an "active" group may include five, or ten, "trusted" users, contacts, and/or TIRCs. Such control over "active" contacts may allow the user to eliminate unverified and/or otherwise untrusted information, and may further invite verified or trusted information, including, for example, the advertisements discussed above. Further, the user may thus eliminate the negatives associated with unfiltered social networking by controlling the input used to affect the rating of desired content.

By way of example, when viewing unfiltered reviews on a travel website, such as Expedia®, for example, the rating provided for hotels within a particular search may be influenced by information that would not be considered "trusted" information by the user if the user were aware of the source of such information. For example, some of the information used in the rating of the hotels offered may have been entered by a person having an economic interest, either in the success or failure, of the rated hotel. For example, a hotel manager may attempt to boost the hotel's rating, while a competitor may seek to provide information to lower the rating—goals that may impact whether the information provided is accurate. Similarly, ratings information provided by unverified guests may likely be overly positive, for example, as it is human nature to not criticize, and further because users prefer to deem their respective choices to be excellent, for example. By enabling discriminated access to making the ratings, and/or by limiting contributions to ratings from the newest users, the present invention may provide a more realistic rating of a particular subject by limiting input based on personal gain, vanity, inexperience, and/or competition, for example.

As mentioned, users may initially be inactive within another user's group, or may be inactivated after having been previously activated. In a preferred embodiment, inactivation of users, contacts, and/or TIRCs may be viewed only by the user of the present invention and may not be known to the inactivated or activated party. Thus, because inactivations remain confidential to the user, the inactivated party does not experience any effect on any information and/or ratings provided to the inactivated party, and the inactivated party may or may not experience any effect on information and/or rating provided by the inactivated party, due to the inactivation. Such a feature may prevent, for example, one or more inactivations of a particular TIRC from affecting the ratings viewed by other users that have that TIRC activated. Conversely, as one skilled in the art will appreciate, the affect of deactivation by the TIRC may be felt not only in the particular topic associated with the deactivation, but in all ratings associated with the TIRC.

The present invention may also allow a user to store and/or bookmark subjects/items/pages and/or users, contacts, and/or TIRCs for future reference. Such "bookmarking" may, to the extent personal to the user, have no effect external to the user's account, even in the event of activation or deactivation, or may have an effect outside a user account. Such bookmarking may have effects such as on ratings, expertise status, advertising, or the like. For example, a user may be deemed a TIRC in a given area if that user is bookmarked by at least 10 people. Such capability may also allow the user to forward information to other users as a recommendation, or in a sharing capacity.

Yet further, in certain of the embodiments illustrated in FIGS. 2, 2A and 2B, a bilateral agreement may be required, that is, a first user may have to accept a relationship with a second user requesting to receive information from that first user, and/or a TIRC may have to accept a request to be a trusted party of the second, requesting user. In such an embodiment, it may be preferable that the second user may have access to all lines of trust of the first user once the first user has accepted the relationship/TIRC status. However, in other embodiments, no bilateral agreement is required. More particularly, in certain embodiments, a user may be able to activate an expert, and receive certain information, or limited information, from that expert, including a portion, such as 5, or all, of the trusted users of that expert, without acquiescence of that expert. Likewise, in non-bilaterial embodiments, a first user may be able to create a relationship with another user, such as to "follow" that other user, without acquiescence by that other user to let the first user follow him/her.

Returning now more particularly to FIG. 2, at block 210 an information request is illustratively received that specifies a category. In an exemplary embodiment, the host server 104 receives an information request from a user 103. The information request may include content filtering information such as the standard filters 277a and/or advanced filters 277b set forth in FIG. 2B. The host server 104 may generate and present a GUI (not shown) to the user 103 for submitting an information request. The information request GUI may include a series of check boxes associated with various categories/sub-categories and a submit button. In an exemplary embodiment, an information request may be generated by selecting one or more categories/subcategories and selecting the submit button. Additionally, the GUI may include a text box for entering a question for submission to a user's trusted information resources. The GUI may further include check boxes or other means for entering filter information for standard filters 277a and/or advanced filters 277b.

Moreover, with respect to the aforementioned sub-categories, the present invention may correspondingly include sub-networks in association with, for example, main categories or sub-categories. In an exemplary embodiment, a user interested in late model Mustangs® automobiles may create and/or adopt a sub-network associated with late model Mustangs® automobiles, such as within a group or network dedicated to collector's cars. Such a sub-network may have associated therewith a limited number of people, such as, for example, about ten people, all of whom may preferably be associated with the larger network. Within such a sub-network or group, information may be shared from a user, contact, and/or TIRC in the group to the user.

In establishing a sub-network, the user may gain access to information that may be shared from the limited number of participants in the selected sub-network, such as information the limited number of participants have selected to populate within each participant's sub-network, for example. The ability to limit the number of user(s), contact(s), and/or TIRC(s) within a group or sub-network allows the present invention to prevent the unchecked aggregation of user(s), contact(s), and/or TIRC(s), and the information related thereto, that may serve to dilute and/or negatively impact the information sought by the user.

Thus, the present invention may provide a greater degree of personalization with regard to the information gathered and consumed by the user. By allowing the user to select from among, or discriminate regarding information from, available user(s), contact(s), and/or TIRC(s), the user is formulating a tailored experience. By choosing a particular TIRC, for example, the user creates a unique and individualized ratings system, as discussed hereinthroughout.

By way of example in this field, Google presently offers Google® Circles in an attempt to offer sub-networks. These Circles are various groups into which friends may be organized. Once groups are populated, a user may select which circles see what information shared by that user (or from what circles that user wishes to receive information). For example, a user's review of a favorite television show may be seen only by friends, a review of the food at the company picnic may be seen only by coworkers, and pictures of a newborn nephew may be seen only by family. Similarly, Facebook allows for friends to be placed into certain categories, although the ability to limit shared information by those categories is less available in Facebook than in Circles.

However, it is very tedious, in both Facebook and Circles, for a user to dedicate the time needed to develop groups, to add new groups as needed, and to place contacts within the groups in order to allow for sharing limited by the category of the contact. Thus, most users presently have different social networks, such as being members of Facebook for friends and family, and LinkedIn for coworkers and acquaintances, to provide this limited sharing function. Further, users will often be unclear as to which group is best suited for certain contacts, such as a cousin who is also a coworker, and will need to continuously review and reorganize contacts.

The present invention does not require grouping or filtering of contacts. Rather, the trustlines of the present invention serve to limit information shared or received based on trusted parties within categories that the user is interested in, i.e., wine, cars, and baseball, rather than categories of friends, family and coworkers. More particularly, trustlines provide a sub-network associated with a category designation (i.e., a sub-network of that user and 10 friends within the category "wine") in which a limited number of people can be assigned (such as 10 or less) to share information from those people to the user. In establishing a sub-network, a user may get access to the information that is shared from the limited number of people, and which the people in that sub-network have selected to populate their respective sub-network, and so on. As such, Circles and Friends are based on categorization of contacts, and in contrast the present invention is at least partially based on lines of trust in a substantive category.

As is graphically illustrated in the hierarchical view of FIG. 6, limiting the number of trusted people in a specific category does not limit the trusted advice the user receives in that category. Rather, it provides for the receipt, by the user, of a comparable volume of information to that information provided by other social network systems or search engines, but with one very significant difference—the volume of information provided to the user in the instant invention is provided by successive hierarchical levels populated solely by trusted advisors. In prior art embodiments, either voluminous information could be obtained only by inquiring with voluminous sources of information, which necessarily included trusted and non-trusted sources; or only limited information could be obtained from a small group of trusted friends. In stark contrast to such prior art embodiments, and as illustrated in FIG. 6, a user that has 5 trusted persons in a category, and who gains access to the 5 trusted persons of each of those 5 trusted persons, ultimately has access to the trusted information from 155 trusted persons at only the third degree of separation from the base user, and it bears noting that all 155 such persons are "trusted" by falling within trustlines traceable solely to the 5 trusted persons named by the base user.

Figure 7:
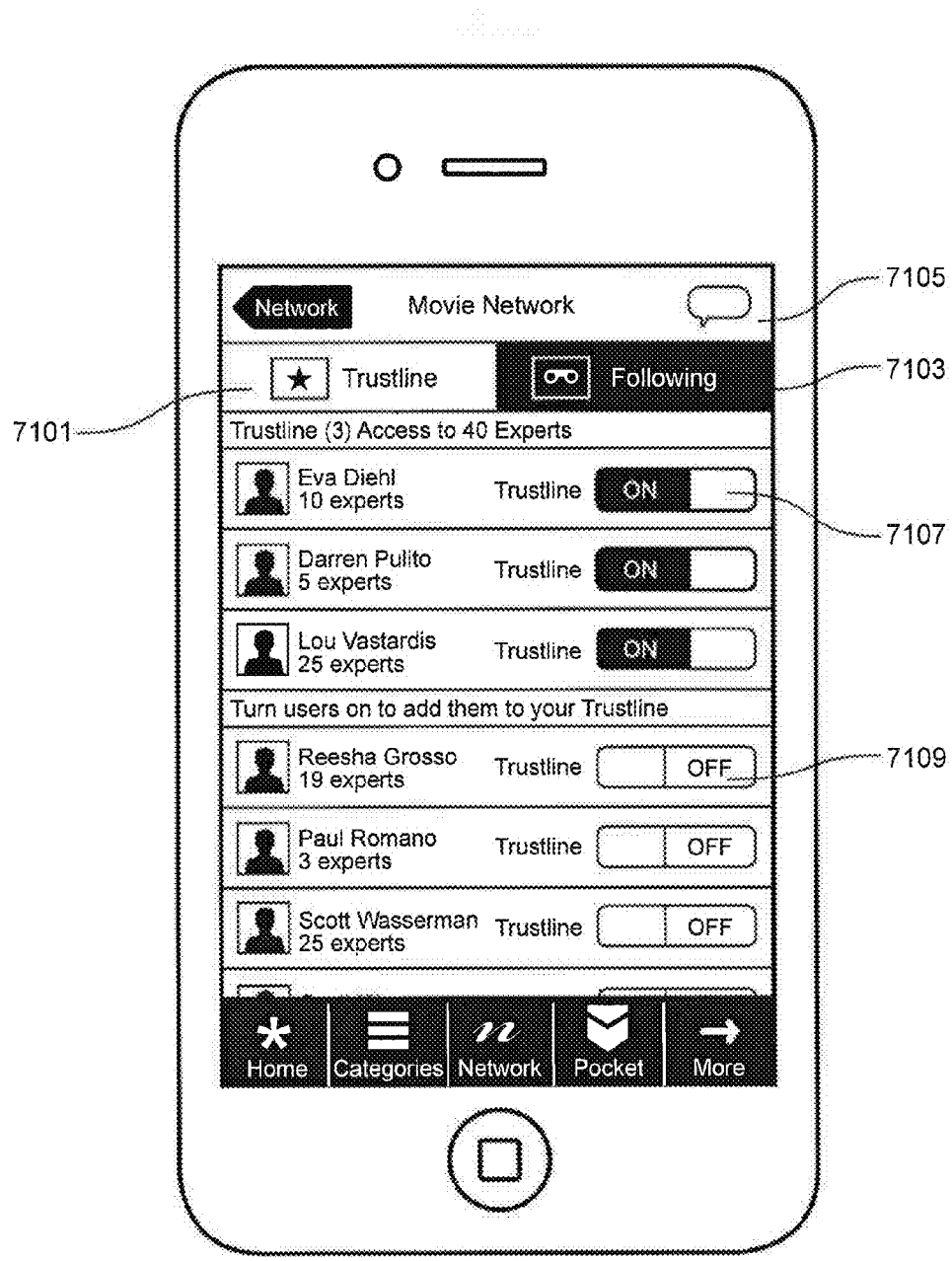
FIG. 7 is a display illustration of the present invention employed on a smartphone.

FIG. 7 illustrates a smartphone having associated therewith at least one processor for executing computing code that causes to be provided the illustrated display. As shown, the display provided, in conjunction with the data and relational aspects provided by the system of the present invention, enables a user to manage trustlines 7101 and following contacts 7103 by category 7105. Further, the user may, via the provided display, turn on 7107 or off 7109, or active or inactive, other users to indicate who that user trusts the most in a particular category. The other users that may be turned on or off are, as shown, from among the contacts of that user in that category. Once active in the user's trustline, the active other users may make accessible to the user their respective trustlines.

Figure 8:
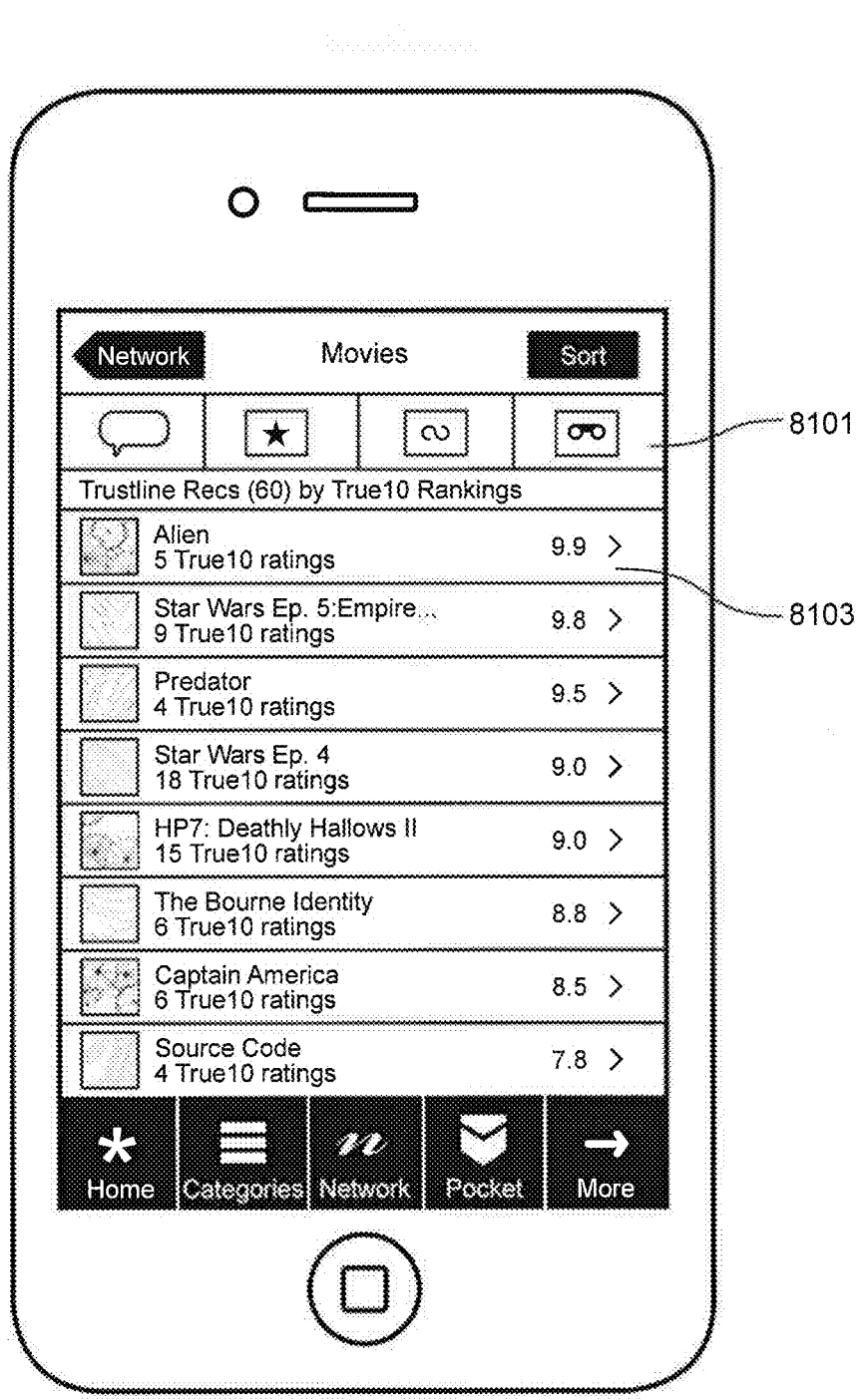
FIG. 8 is a display illustration of the present invention employed on a smartphone.

FIG. 8 illustrates a smartphone displaying a tabbed access bar 8101 of a trustline index, persons in a trustline, contacts, and following contacts. As shown, the trustline has been accessed and the trusted recommendations in the selected category are thus displayed 8103. The scrolling list of recommendations may be, for example, sorted alphabetically, or by rating or score, while allowing for a comparison of sources of the trusted information.

Figure 9:
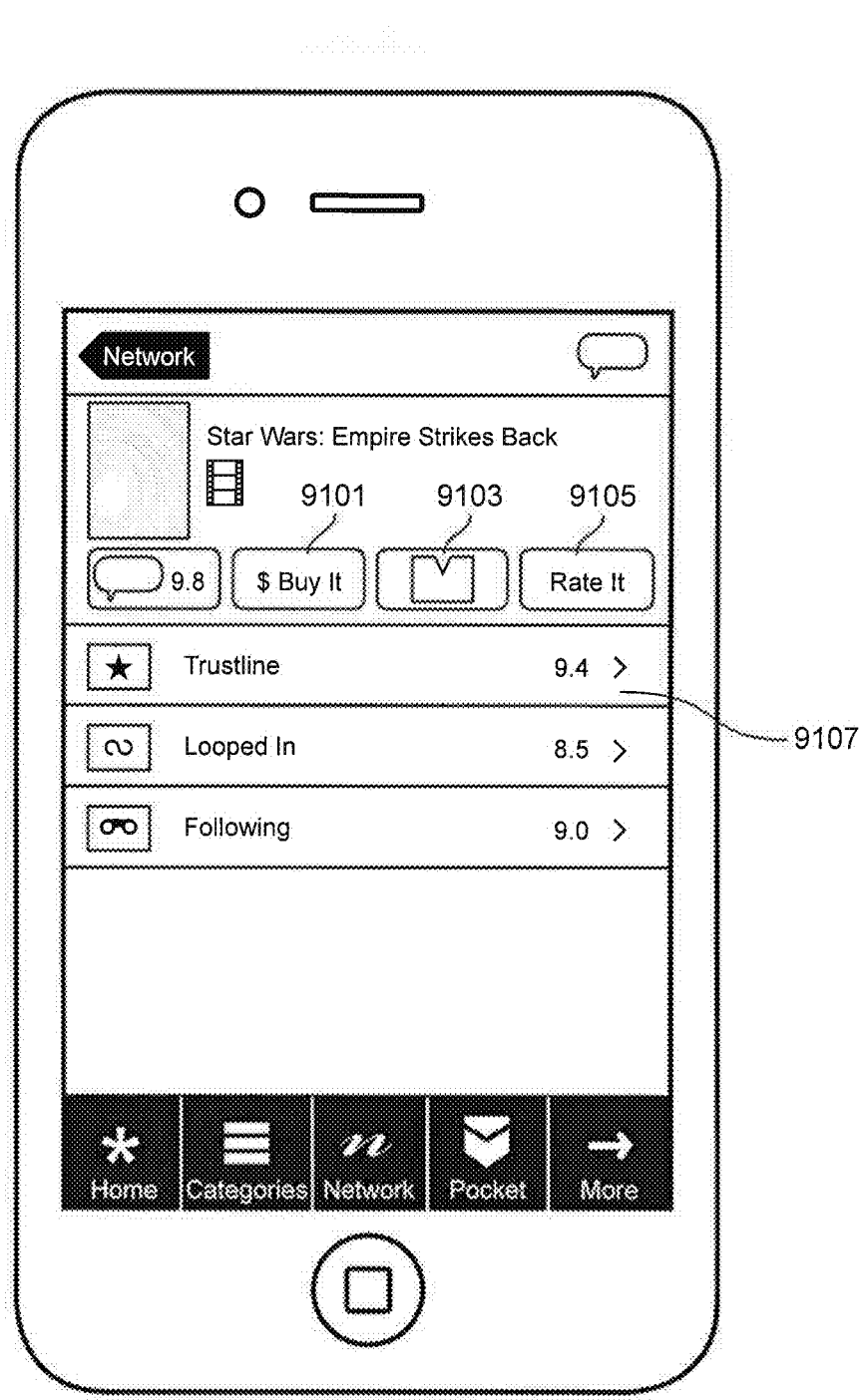
FIG. 9 is a display illustration of the present invention employed on a smartphone.

FIG. 9 illustrates that a user may access, via the display, a purchase capability for one of the recommendations provided in the scrolling list of FIG. 8. This display may allow for a purchase 9101, saving of the recommendation for later review 9103, rating of the recommendation 9105, and/or drill-down into the recommendation 9107, such as by review of the recommending persons, the recommendation channel, and/or review of the recommendations.

Continuing now more particularly with FIG. 2, at block 212, a first set of users within the user's network are identified that are associated with the category (i.e., contacts 255 in category-based network 265) and that are established as TIRCs for that category (i.e., contacts 255 in set 270). In an exemplary embodiment, the host server 104 identifies the first set of users by examining the social network database 122 based on the category specified in the information request and the user's established TIRCs for that category. The first set of users may be thought of as "experts" from the viewpoint of the user.

At block 214, a second set of users within the category-based networks of the first set of users are identified that are associated with the category and that are designated as TIRCs for the category by the first set of users. In an exemplary embodiment, the host server 104 identifies the second set of users by examining the social network database 122 based on the category specified in the information request and the TIRCs established of the first set of users for that category. The second set of users may be thought of as "experts" of the first set of users, e.g., the expert's experts. The steps of block 214 may be repeated to obtain information from TIRCs that are farther removed from the user, e.g., the expert's expert's expert, the expert's expert's expert's expert, and so on.

At block 216, information is retrieved for identified users. In an exemplary embodiment, the host server 104 retrieves information from the database 122 for identified users (e.g., those identified in steps 212 and/or 214) corresponding to the information request. The information may be ratings and/or reviews of products within the selected category (step 210), or answers to questions within the selected category. For example, assume the category is action films. The host server 104 may retrieve all ratings and/or reviews of action films by the TIRCs identified in steps 212 and/or 214. If a user has a question associated with a category, the information may be retrieved by disseminating the question to the identified users and gathering responses from the identified users.

At block 218, retrieved information is provided to a user. In an exemplary embodiment, information retrieved by the host server 104 from the database 122 at block 216 is transmitted to the client device 102 from which the information request was received (step 210) where it may be viewed by the user 103.

By way of non-limiting example, one group or persons that very, very frequently seeks trusted advice is expecting and new mothers. Expecting and new mothers most assuredly have access to voluminous information, such as via the Internet, and yet studies have shown that new and expecting mothers continue to rely on a limited number of resources. The reason for the reliance on this limited subset of all available resources is that mothers feel that much of the remaining information cannot be trusted, i.e., only those resources that are historically trusted by other mothers will be trusted by a new or expecting mother. However, even if trust should be limited to just a small subset of available information, there is nevertheless not a uniform resource to which new and expecting mothers can go to find which resources constitute this small subset.

The present invention remedies each of the aforementioned problems for a group, such as new and expecting mothers, that is very highly dependent on obtaining information from trusted sources. For example, may new and expecting mothers receive their respective indications of what resources to trust from their respective friends and family. In the present invention, such new and expecting mothers may add and activate as resources, or TIRCs, a limited subset of those friends and family members from whom the mothers most wish to receive advice. Further, it goes without saying that other persons trusted by those trusted friends and family will likewise prove trustworthy to the new or expecting mother. As such, the resources recommended by the members of the trustline terminating at the new or expecting mother should prove to be the most trusted resources for that new or expecting mother. Thereby, the most trusted information resources for the new or expecting mother are made available at a single location through the use of the present invention. Correspondingly, the volume of trusted information sources is expanded for the new or expecting mother, in part because the trusted social circle of the new or expecting mother has expanded to include trusted persons outside of the immediate social circle of that new or expecting mother, but without clouding the trust circle with less trusted sources or voluminous, unwanted information.

The exemplary embodiments and steps described above enable a user to monitor new ratings, reviews and other UGC of their TIRCs within a desired category and the TIRCs of these TIRCs, etc.; search ratings, reviews and other UGC of TIRCs within a desired category and the TIRCs of these TIRCs, etc.; and send questions to or communicate directly with TIRCs within a desired category and to/with the TIRCs of these TIRCs, etc. Monitoring, searching, and sending functionality is described in further detail below:

Monitoring—user 103 can set personal preferences within the social network to receive information through direct links established through extended category-based networks of users identified as TIRCs within those category-based networks. The information from these TIRCs can include ratings, reviews, links, UGC, etc. Within this mode of functionality the user receives the information automatically, e.g., periodically or as it is posted by users. The information can be filtered by criteria such as set forth in standard filters 277a and/or advance filters 277b (FIG. 2B) including by way of non-limiting example, the degrees of separation from the TIRC, the status of active TIRC designations, the number of UGC posts, ratings or reviews within a specific topic category by each TIRC, and the social network communities' approval or rating of a TIRC's UGC, ratings, reviews, etc.

As an example, a user may set her "monitor" preferences to notify her of reviews down to the third degree of separation by TIRCs within category-based networks for a particular category (e.g., Italian restaurants) with a particular rating (e.g., above 9.3).

Figure 10:
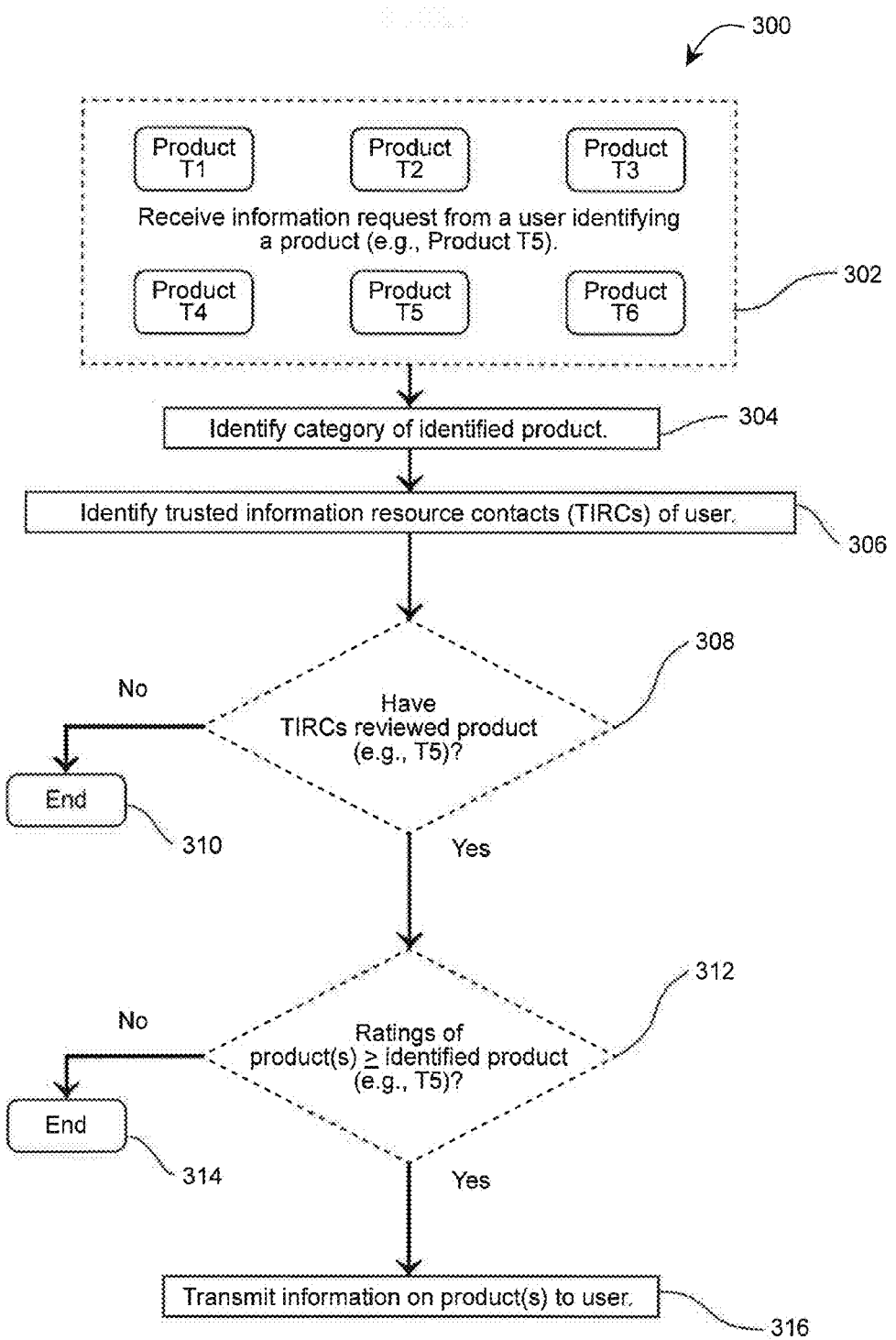
FIG. 10 is a flow chart of exemplary steps for requesting information on other products related to a product of interest to the user in accordance with an aspect of the present invention.

FIG. 10 depicts a flowchart 300 of exemplary steps for monitoring reviews in accordance with one aspect of the present invention. At block 302, a information request is received (e.g., at host server 104) from a user identifying a particular product (e.g., product T5 from a group of products including products T1-T6). At block 304, a category/subcategory associated with the identified product is identified. For example, the host server 104 may identify the category/subcategory (e.g., Napa Cabernets) associated with product T5 by comparing a product identifier (e.g., UPC code) for product T5 with entries in a database.

At block 306, TIRCs of the user for the identified category are identified. In an exemplary embodiment, host server 104 identifies TIRCs for the identified category as described above for blocks 212 and 214 of flow chart 200.

At block 308, host server 304 determines if the TIRCs have reviewed the product identified by the user. In an exemplary embodiment, host server 104 compares a product identifier of the identified product to product identifiers of all products reviewed by the TIRCs. If there is not a match, processing ends at block 310. If there is a match, indicating that one or more of the TIRCs have reviewed the identified product, processing proceeds at block 312.

At block 312, host server 304 determines for each TIRC that has reviewed the identified product whether they rated another product the same or higher than the identified product. If no TIRC has rated any other products within the category equal to or greater than they rated the identified product, processing ends at block 314. If one or more TIRCs rated one or more other products equal to or greater than the identified product, processing ends at block 316 with information for those products being transmitted to the user device 102 of the user 103 requesting the information. This process allows a user to quickly and easily identify other products that the user may wish to try because they were rated by the user's expert, expert's expert, and/or expert's expert's expert, as equal to or better than the identified product.

Searching—user 103 can search for ratings, reviews, user generated content, and published content by keywords, pictures, dimensional barcodes, non-dimensional barcodes, UPC codes, geocode, GPS coordinates, and more, through direct links established through extended category-based networks of users identified as TIRCs within a category. Within this mode of functionality the user actively requests the information. The information can be filtered by criteria such as set forth in standard filters 277a and/or advanced filters 277b (FIG. 2B), including by way of non-limiting example, the degrees of separation from the TIRC, the status of active TIRC designations, the number of UGC posts, ratings or reviews within a specific topic category by each TIRC, and the social network communities' approval or rating of a TIRC's UGC, ratings, reviews, etc.

As an example, a user may search for ratings, reviews, or other valuable UGC by scanning the barcode on Malcom Gladwell's book "Outliers" in order to receive relevant information from up to the fifth degree of separation within his trusted resource or expert category-based network for books.

Q&A'ing—user 103 can send questions to be answered through direct links established through extended category-based networks of users identified as TIRCs within a category. Within this mode of functionality the user actively requests answers to questions. The TIRC can filter questions to answer based on, for example, the degrees of separation from the questioning user. The answers can be filtered by criteria such as set forth in standard filters 277a and advance filters 277b (FIG. 2B), including by way of non-limiting example, the degrees of separation from the TIRC, the status of active TIRC designations, the social network communities' approval or rating of a TIRC's answers, and other indications of credibility or status.

As an example, a user may send a question out to his trusted resource network for wine, "I am going to San Francisco next month. If I have two days in Napa, what wineries should I try to schedule a tasting?" By way of further example, one group that frequently seeks trusted advice is those seeking medical advice from trusted medical professionals. Those seeking medical advice most assuredly have access to voluminous information, such as via the Internet, yet very little of that information is likely to be trustworthy.

Figure 11:
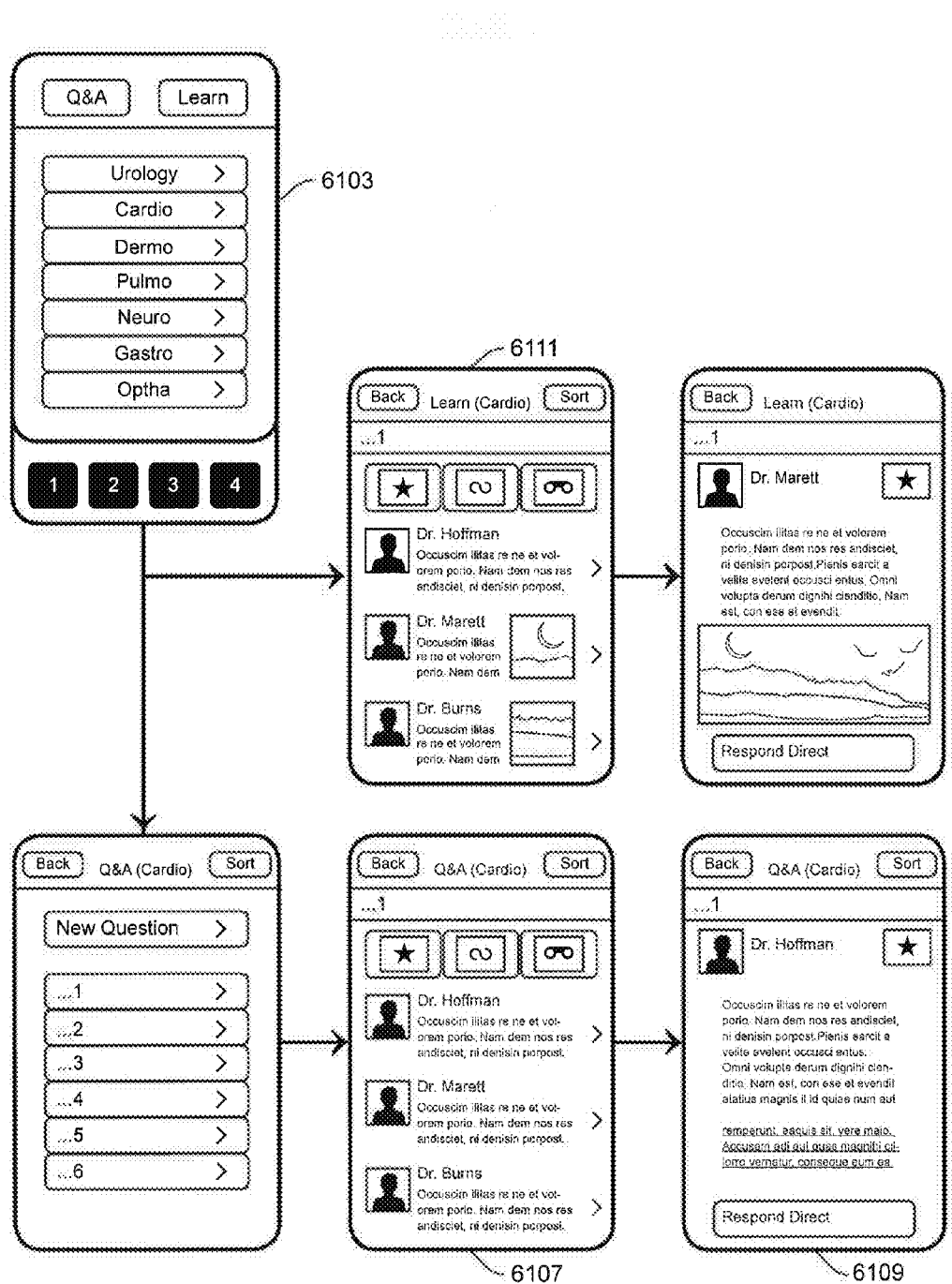
FIG. 11 is a diagrammatic display flow diagram of aspects of the present invention.

FIG. 11 illustrates a trusted system for providing medical information according to the present invention. As shown, computing code executable by a processor associated with a smartphone causes the display 6103 of a menu of medical topics, as well as a navigation tool, such as to allow the user to go to a home menu ("1"), view available categories ("2"), post, receive or upload ("3"), engage in a question and answer ("Q&A") with a trusted expert about a topic or topics ("Q&A"), or learn about a topic from trusted experts ("Learn").

As is further illustrated, a user may engage in the Q&A with a question on a given topic, such as "Cardio." The question may produce answers from TIRCs indicated by the questioning user's most trusted persons and/or trustlines, as shown at step 6107. Further, a particular TIRC may be deemed the best TIRC for the topic, and/or to give the best, or highest rated, response, at step 6109, and that response may include preferred links, bookmarks, or similar guidance from the most trusted TIRC. Likewise, a user may learn from members of the trustlines in that category for the user, i.e., from the most trusted users of users in that questioning user's topical sub-network, as shown at step 6111.

Another aspect of the present invention relates to an adaptive rating system and method that ensures that ratings of entities (e.g., (product, person, service, experience, etc.) remain relevant for a user as that user's level of experience matures. For example, a user rating a bottle of wine may have a different rating opinion after having rated 50 bottles of wine than after rating three bottles of wine. The present invention enables past and/or new ratings to be automatically adjusted in order to make them more relevant.

Figure 12:
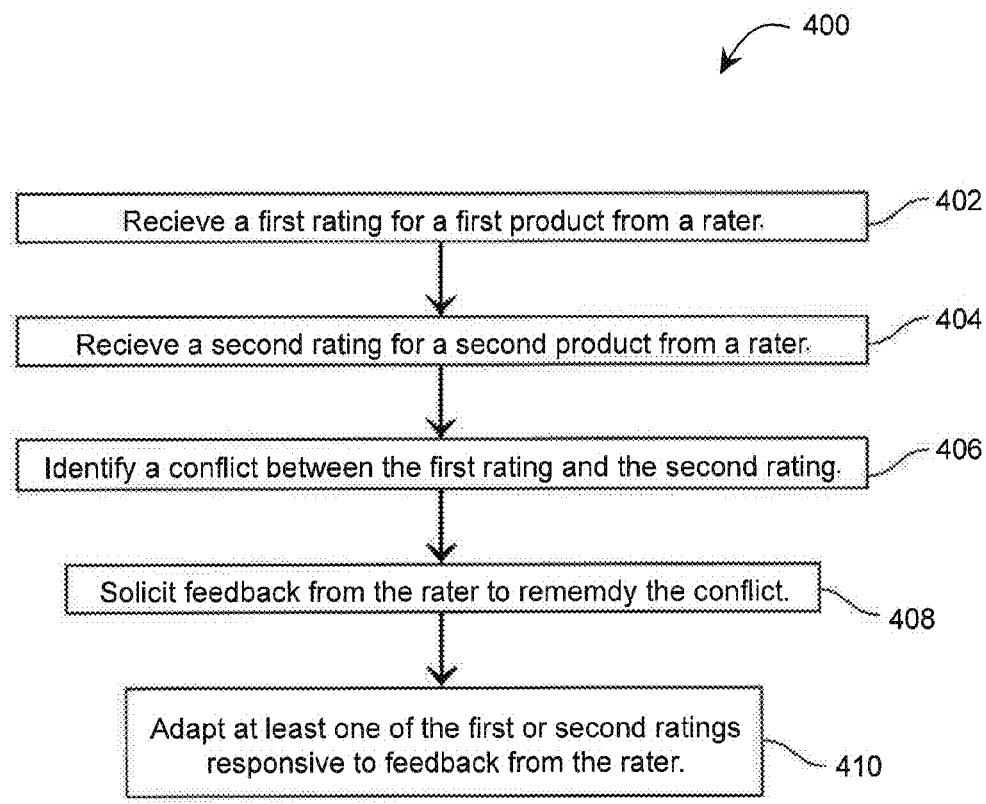
FIG. 12 is a flow chart of exemplary steps for adapting a rating scale in accordance with aspects of the present invention.
Figure 12A:
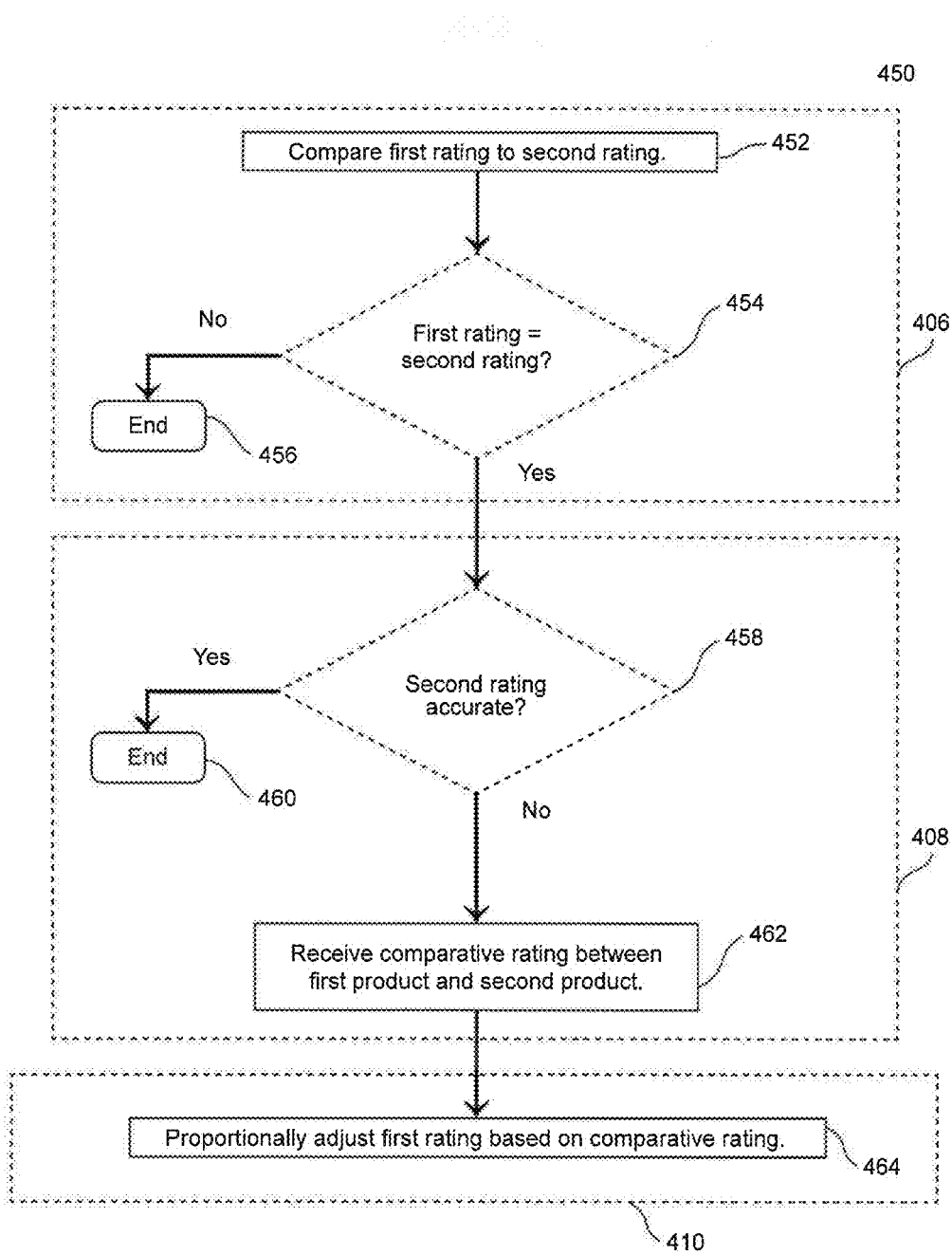
FIG. 12A is a flow chart of exemplary sub-steps for performing steps of the flow chart of FIG. 4.

FIG. 12 depicts a flow chart 400 of exemplary steps for adapting ratings and FIG. 12A depicts a flow chart 452 of exemplary sub-steps within the steps of flow chart 400. The steps of flow charts 400 and 450 will be described with reference to the system 100 depicted in FIG. 1 to facilitate description. Other suitable systems will be understood by one of ordinary skill in the art from the description herein.

At block 402, a first rating for a first product is received from a user. The rating may be a rating on a scale of 1 to 10 (e.g., a nine) for a product within a category or within a subcategory (e.g., a wine or a California Pinot Noir). In an exemplary embodiment, processor 116 may be coupled to a receiver (not shown) that receives the rating from a user 103 via user device 102 over network 106.

Figure 13A:
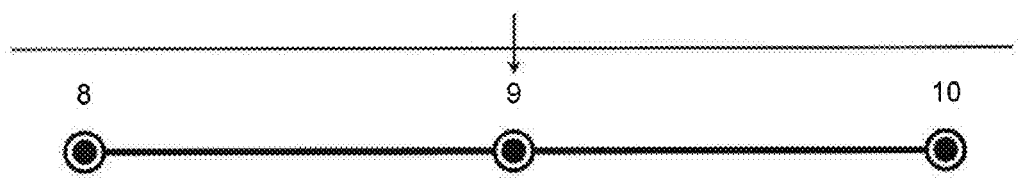
FIGS. 13A, 13B, and 13C are illustrations of a rating scale in accordance with aspects of the present invention.

At block 404, a second rating for a second product is received from the user. The rating may be a rating on a scale of 1 to 10 (e.g., a nine) for another product within the category or subcategory (e.g., a wine or a California Pinot Noir). In an exemplary embodiment, processor 116 may be coupled to a receiver (not shown) that receives the rating from the user 103 via user device 102 over network 106. FIG. 13A depicts a user attempting to rate a second/new product that same as a first/benchmark product (e.g., as a "9").

Referring now again to FIG. 12, at block 406, a potential conflict is identified between the first rating and the second rating. In an exemplary embodiment, processor 116 identifies the potential conflict. FIG. 12A depicts exemplary sub-steps for identifying a potential conflict (step 406). At sub-step 452, processor 116 compares the first rating to the second rating. At sub-step 454, processor 116 determines if the first rating equals the second rating. If the ratings are equal, processor 116 identifies a potential conflict and processing proceeds at block 408. If the ratings are not equal, processing ends at block 456.

At block 408, feedback is solicited from the user to remedy the potential conflict. In an exemplary embodiment, processor 116 solicits feedback to remedy the potential conflict.

FIG. 12A depicts exemplary sub-steps for soliciting feedback to remedy the potential conflict (step 408). At sub-step 458, processor 116 determines if the second rating is accurate based on the current rating scale for the category. The current rating scale includes at least one rating of a product (e.g., the first rating for the first product). In an exemplary embodiment, processor 116 sends a first inquiry to the user asking if the second rating is accurate based on the current rating scale (e.g., should the second product have the same rating as the first product). If the second rating is inaccurate (e.g., no, the first and second products are not equivalent to the user rating the products, processing proceeds at block 462. If the second rating is accurate (e.g., yes, the first and second products are essentially equivalent to the user rating the products), processing ends at block 460.

Figure 13B:
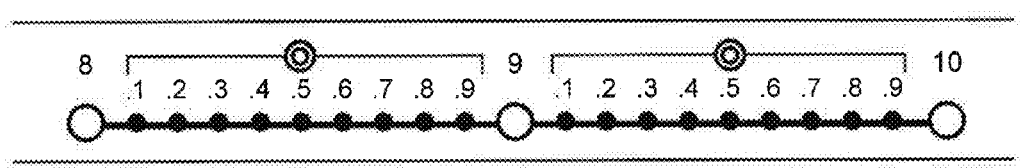

At sub-step 462, processor 116 receives a comparative rating between the first product and the second product. In an exemplary embodiment, processor 116 sends a rating scale such as depicted in FIG. 13B for display by user device 102 to solicit feedback from user 103. The depicted rating scale provides a number of subintervals in the vicinity of the first product rating for selection by user 103. For example, if the second product is a little better than the first product and the first product has a rating by user 103 of "9", the user may select a slightly higher rating, e.g., "9.5" on the rating scale. In this case, the comparative rating would be "0.5" better. Similarly, if the second product is a little worse than the first product, the user may select a slightly lower rating, e.g., "8.5" on the rating scale. In this case, the comparative rating would be "0.5" worse. The user may enter the comparative rating in other well known manners, e.g., by typing in a comparative value or other value from which a comparative value may be obtained.

At block 410, the first or second rating is adapted responsive to the feedback solicited from the user. In an exemplary embodiment, processor 116 adapts the first or second rating. FIG. 12A depicts an exemplary sub-step for adapting that rating of the first or second rating (step 410). At step 464, processor 116 proportionally adjusts the first rating based on the comparative rating. In an exemplary embodiment, the rating of a first product is only adjusted when the first product has the maximum value rating on the rating scale (e.g., a value of "10" on a ten-point scale) and a maximum value rating is received for a second product that they user believes should have a higher rating than the first rating.

Figure 13C:
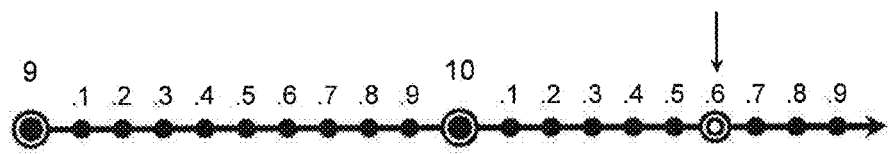

As an illustrative example, consider a first product having a rating of 10 as previously rated by the user. If the user attempts to rate a second product as a 10, similar to as illustrated in FIG. 13A, the system (e.g., processor 116) will identify a conflict. Feedback will then be solicited from the user to determine if the second product should have the same rating as the first product. If the user indicates that it should not have the same value, the user submits a comparative rating of the second product to the first product, e.g., a rating of 9.1-9.9 or 10.1-10.9. In an exemplary embodiment, if a rating of 10.1 to 10.9 were received from the user (e.g., 10.6 as illustrated in FIG. 13C), the second product would then be established as a benchmark for a rating of 10 and the first product (and any other previously rated products for the category) would be proportionally re-rated, e.g., by processor 116. For example, if the first product had a rating of 10 and the second product was given a comparative rating of 10.6, the first product would be given a rating of 9.4 (10.0−0.6=9.4) and the second product would be established as a 10. It will be understood that the system could be applied to many ratings for many products, in which case all the previously rated products may be automatically adjusted in a manner similar to the first product.

For example, as a first step (STEP ONE) ratings may be received by the host server 104 from a user 103 rating multiple products within a category, e.g., product 1=3, product 2=5, and product 3=8. The host server 104 may then proportionally adjust the ratings of the products to a standardized scale in which the rating of the highest rated product is set to the top value of the standardized scale and the ratings of the other products are proportionally adjusted. For example, if the standardized scale is a ten-point scale, product 3 may be set to 10 and products 1 and 2 may be proportionally adjusted, e.g., product 1 equals 4 (3/8*10=3.75) and product 2 equals 6 (5/8*10=6.25). Next (STEP THREE), the host server 104 receives a rating for a product within the category from the user 103 that has a rating higher than the highest rated product within that category, e.g., product 4 equals 10.9. Finally (STEP FOUR), the host server 104 adjusts the new rating to the highest rating and proportionally adjusts the other ratings. For example, product 4 is set equal to 10; product 1 is set equal to 4 (Old Score−Old Score*Adjustment Factor=Old Score−Old Score*(Max benchmark for 10−10)/10=Old Score−Old Score*(10.9−10)/10=4−4*0.09=3.64); products 2 is set equal to 5 (Old Score−Old Score*Adjustment Factor=Old Score−Old Score*(Max benchmark for 10−10)/10=Old Score−Old Score*(10.9−10)/10=6−6*0.09=5.46); and product 3 is set equal to 9 (Old Score−Old Score*Adjustment Factor=Old Score−Old Score*(Max benchmark for 10−10)/10=Old Score−Old Score*(10.9−10)/10=10−10*0.09=9.1). In another embodiment, ratings are proportionally adjusted whenever a potential conflict is identified and a comparative rating (e.g., higher and/or lower) is received from a user.

Aspects of the adaptive rating system may include by way of non-limiting example:

a) A rating system where the entity (product, person, service, experience, etc) with the highest rating serves as the benchmark for which all lower rated products or experiences are ranked against within a specific category.

b) A process that requires the user to rate any new entities in relation to the value of current benchmarks within a specific category.

c) A rating system where a process requires the user, when attempting to rate an entity that has an equal rating to an existing entity, to confirm that the rating of the entity is truly equal, where if the rating of the new entity is not equal, the rating of the new entity has to be set either greater than or less than the previous benchmark for that entity.

d) A process that when the user indicates that the rating of a new (or re-rated) entity is greater than the current highest benchmark, all the rating of entities weighted in relation to the former benchmark are adjusted proportionally.

The present invention is capable of adjusting ratings as a user's tastes mature and experience within a category/subcategory evolves, while keeping scores based on a relative scale. For example, a user tries a mid-tier Bordeaux as one of their first wine experiences and give it a 10. As the user tries other wines they do not enjoy as much they will rate them less than 10 (using the mid-tier Bordeaux as the top of the scale). The user may eventually try a Bordeaux they enjoy more than any other he has previously experienced. When he tries to give it a score of 10, the adaptive rating system/method requires him to rate this Bordeaux in comparison to the mid-tier Bordeaux that is currently serving as his benchmark for "10". If the user feels they are equal, both remain a 10. If the user rates the new Bordeaux greater than the current standing mid-tier Bordeaux (e.g. 10.5), the 10.5 Bordeaux becomes the new benchmark for "10". The previous mid-tier Bordeaux that represented 10, along with all the wines that were rated in comparison to the mid-tier Bordeaux are automatically adjusted in relation to the new 10 point scale now established by the 10.5 Bordeaux. By adapting the rating scale (maintaining a True10 rating system), the value of an individual rating becomes significantly more valuable and relevant to users within a network.

The adapted score makes an expert's ratings or recommendations more relevant, which can be further enhanced by considering additional features, including, but not limited to:

a trust index: how many people directly trust a person as a TIRC (e.g., expert) for a specific category;

a like index: the degree to which other users "like" the answers, recommendations, and/or ratings of an expert; and an experience index: how many products the expert has rated, questions they have answered, etc.

For example, a reviewer/expert may be evaluated on a scale of 0 to 10 based on the following four characteristics: (1) number of reviews written ("WRITTEN"), (2) number of reviews read by other users ("READ"), (3) number of times identified as a TIRC by other users ("EXPERT"), and (4) number of times reviewed were identified by other users as helpful ("HELP"). For each characteristic, a maximum point level (e.g., 10) may be given to a reviewer/expert with the largest number of reviews/customer indications. Each evaluation characteristic may be assigned a weight coefficient correlated with its contribution to an overall evaluation to obtain a final evaluation score, e.g., ranging from 0 to 10. Maximum values for one or more characteristics may be designated. In one example, WRITTEN has a weight of 0.2 ($K_w$=0.2), READ has a weight of 0.5 ($K_R$=0.2), EXPERT has a weight of 0.5 ($K_E$=0.5), and HELP has a weight of 0.5 ($K_H$=0.1). Input variables may include: (1) i, reviewer's index (i=0 . . . N where N is the total number of reviewers); (2) $W_i$ number of reviews written by the ith reviewer; (3) $W_{max}$, maximum number of reviews written by a reviewer/expert; (4) $R_i$, number of reviews by ith reviewer/expert that were read by other users; (5) $R_{max}$, maximum number of ith reviewer/expert read reviews; (6) $E_i$ number of times ith reviewer/expert identified as a TIRC by other users; (7) $E_{max}$, maximum number of TIRC identifications; (8) $H_i$, number of reviews by ith reviewer/expert identified as helpful; (9) $H_{max}$, maximum number of reviews by ith reviewer/expert identified as helpful. An exemplary algorithm for determining a weight of each reviewers/experts, i, may be as set forth in equation (1).

$$EV = K_W \frac{W_i}{W_{max}} 10 + K_R \frac{R_i}{R_{max}} 10 + K_E \frac{E_i}{E_{max}} 10 + K_H \frac{H_i}{H_{max}} 10 \quad (1)$$

Figure 14A:
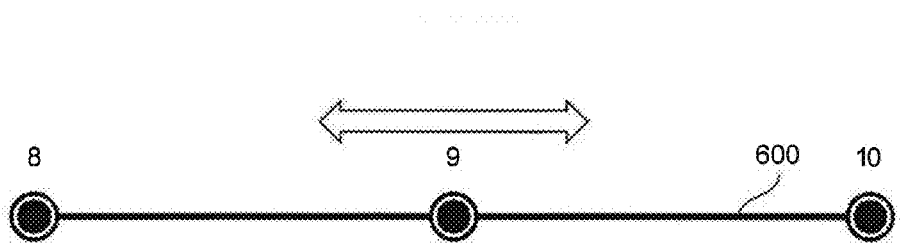
FIGS. 14A and 14B are illustrative representations of an exemplary comparative rating scale in accordance with an aspect of the present invention.
Figure 14B:
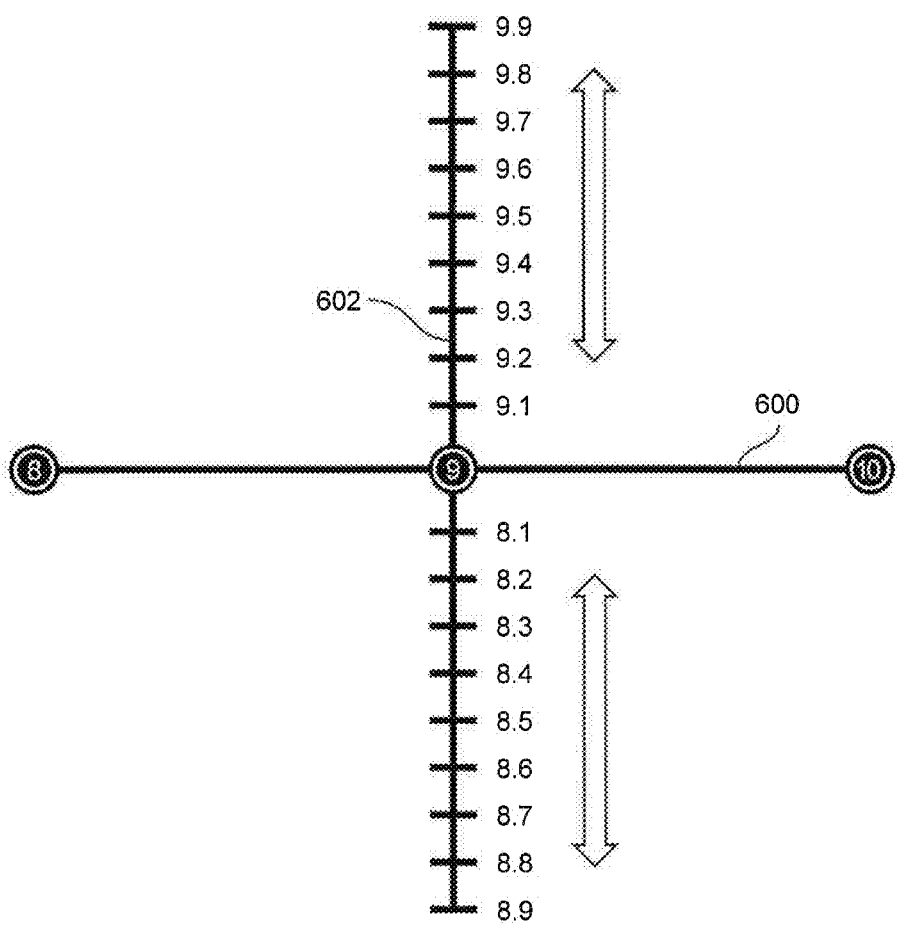

FIGS. 14A and 14B depict an exemplary user interfaces for rating products. In FIG. 14A, a user is presented with a portion of a rating scale 600, e.g., integers 8, 9, and 10 of a ten-point scale. The host server 104 may present the rating scale horizontally on a user device 102. A user 103 may select a rating by moving an indicator along the rating scale 600 and selecting a particular point on the rating scale when the position of the indicator corresponds to the desired rating. For example, the user may utilize a user input device such as a mouse (not shown) to move the indicator and may depress a key on the mouse to make a rating selection. If a rating conflict is identified, e.g., by host server 104 as described above with reference to block 458 (e.g., the user tries to rate a new product as a "9" and there is an existing products rated as a "9"), the user is presented with a comparative rating scale such as depicted in FIG. 14B for use in making a comparative rating. The host server 104 may present the comparative rating scale 602 in an orientation other than the orientation of the rating scale 600, e.g., vertically, on a user device 102. In the illustrated embodiment, comparative rating scale 602 has finer granularity than rating scale 600. The user may then be required to select a comparative rating on the comparative rating scale 602 between the next value greater "10" and the next value lower "8," e.g., between 8.1 and 9.9, using an input device such as a mouse moving vertically along the comparative rating scale 602.

Figure 15:
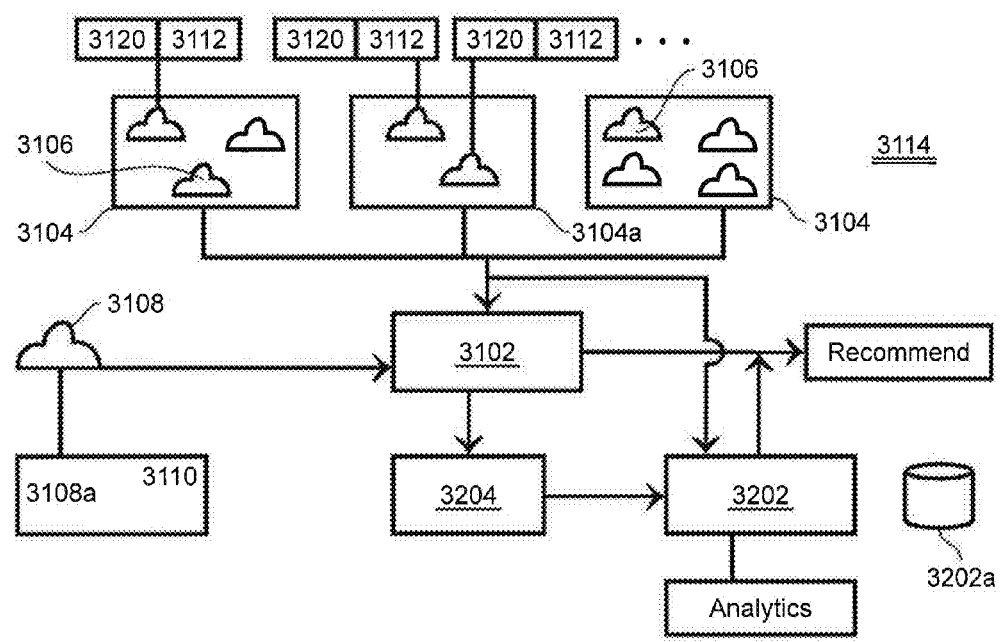
FIG. 15 is a block diagram illustrating aspects of the instant invention.

Adaptive ratings and feedback may likewise be, or be included as aspects of, an analytics system according to the present invention. In an embodiment of the present invention and as illustrated in FIG. 15, a recommendation engine 3102 may be used to automatically suggest or modify at least one group 3104, or group members 3106, or user status 3108a, based on the preferences of the user 3108 and/or the user's use 3110, or another user's use 3112, of the system 3114 of the present invention. More specifically, the recommendation engine 3102 may allow the system to view the performance and/or attributes 3120 of group member(s) 3106, member information, and/or the like, such as to provide an optimal group 3104a for use by the user. For example, an analytics engine 3202 may be employed which may track certain member attributes 3120 or system attributes 3204 such as: TIRC linkages by system users, the number of ratings/comments by system participants; linkages between member(s); the user's viewing of group results; the views of system users regarding certain subjects; percent change in trustlines turned on for a user; number of invites to a user, or from a user; number of times bookmarked, or number of times bookmarking other users; purchases made based on recommendations from; status as a super TIRC; the personal characteristics and/or cookies of the user; the content placed by the user; and the status of system participants, for example. Such tracking may be performed by a relational database 3202a, such as that illustrated in FIGS. 16A-C, accessible to analytics engine 3202 to allow for analysis of the data in the database 3202a.

The information collected by the analytics engine may then be used by the recommendation engine to enhance and/or protect the integrity of a user's group; to monetize data for or from advertising; to verify TIRC status, or the like. For example, information gathered by the analytics engine and processed by the recommendation engine may indicate that a particular TIRC within the system has had a change in status occur such that, for example, over 50% of system users switched that TIRC to "inactive" from "active." The recommendation engine may review the user's group(s) and, if that particular TIRC is "active" within a user's group(s), a status change recommendation may be made to the user, such as, for example, suggesting a switch of that TIRC to "inactive." Similarly, if a particular TIRC is used by a high proportion of users (as compared to other TIRCs), and the TIRC is associated with a subject that the user has groups associated with, or has visits/searched in the past, the recommendation engine may make a recommendation for the user to investigate that TIRC. Such recommendation may be in the form of a banner ad, a highlighted link, or the like, for example.

The recommendation engine of the present invention may also provide for the creation of groups and/or pools of user(s), contact(s), and/or TIRC(s) related to particular subjects that may be offered to users of the system. Utilizing information from the analytics engine, the recommendation engine may provide recommendations to or of certain user(s), group(s), contact(s), and/or TIRC(s) associated with a subject estimated to be of interest to the user, such as based on the user's existing groups and browsing history, and/or may recommend creating a group to the user. Such recommendations may include at least one advertisement related to the subject. For example, if the user has one or more groups related to travel, a group focused on hiking in New Zealand may be offered to the user. The same offer may include advertisements from tour operators offering New Zealand based travel packages, for example.

In an embodiment of the present invention, the recommendation engine may recommend a particular TIRC, rather than a group, and/or may promote the TIRC based on factors such as the TIRC's usage within the system, the TIRC's active group participation among users of the system, and/or the affinity of the TIRC to advertisements (e.g., the click-through rate of advertisements linked to, or endorsed by, the TIRC). In this way, participants in the system may be encouraged to become TIRCs, and may look to economically benefit from the associated advertising.

Yet further, the analytics engine, such as through analysis of a user's preferences, TIRCs, and searches, may glean user characteristics akin to those gained by "cookies" in other embodiments. However, in the instant invention, the additional information gleaned from that characteristics of those persons selected as that user's TIRCs provide an additional refinement capability in the user profile not available in the prior art. Thereby, for example, the present invention provides an appreciable enhancement in the ability to target advertised products and services to an individual, and further allows for an improved ability to consider what endorsements or sponsorships may work best in convincing that user to engage in an electronic transaction.

Figure 17:
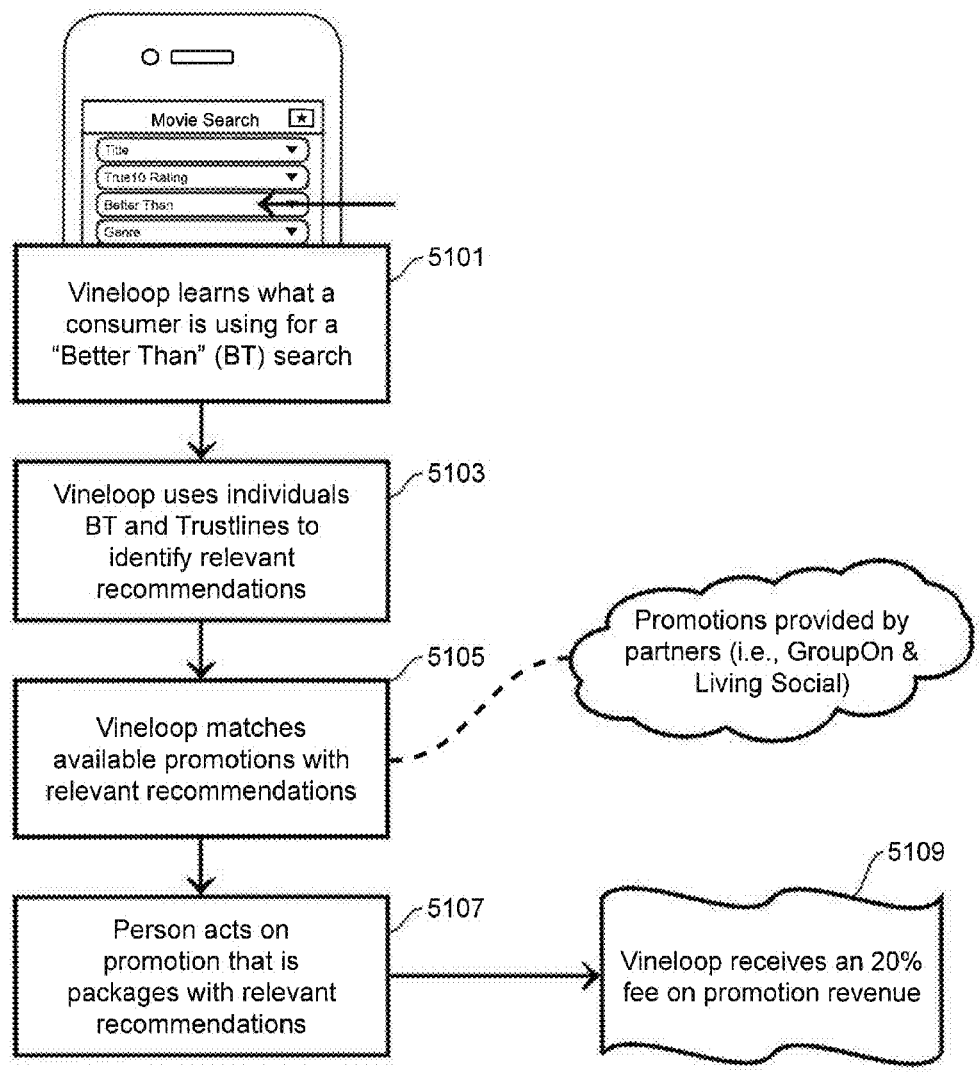
FIG. 17 is a flow diagram of aspects of the present invention.

Accordingly, the present invention may, through the use of the analytics and recommendation engines, build maps of significant influencers. Such an influencer map may be based on trust, trust levels, expertise, or super-expertise, such as may be evidenced by those influence that get people to store or save the recommendations of that influencer. Likewise, and according to the flow illustrated in FIG. 17, maps may be created of targeted customers (individuals and segments), requests may be received for targeted customers, or recommendations may be made as to targeted customers. For example, the recommendation engine may receive, such as via the analytics engine, a topic of interest to a user 5101, such as via analytics, cookies, or via a user search. The user may be analyzed, such as by analysis of that user's active trustlines, TIRCs, groups, or the like, in light of the topic deemed of interest to the user, to identify relevant recommendations from the recommendation engine at step 5103.

The recommendation engine may thereafter, at step 5105, match available promotions, such as may be provided via an associated database, ad server, or the like, with the relevant recommendations. The available promotions may be provided by partners making available discounts, or may be provided indiscriminately, such as by an ad server. Partners may include, for example, GroupOn or Living Social. Further, the promotion may be delivered, such as at step 5105, quite literally with the trusted recommendation, such that a uniquely powerful marketing opportunity is provided by the present invention.

The user receiving the recommended promotion may then take action on the promotion, such as at step 5107. Once action is taken, the provider of the recommendation engine may receive, at step 5109, a percentage of the revenue generated by the transaction, as may the promotions partner, by way of non-limiting example.

As referenced throughout, it is contemplated that one or more of the various components and steps described above may be implemented through software that configures a server to perform the function of these components and/or steps. This software may be embodied in a non-transient machine readable storage medium, e.g., a magnetic disc, an optical disk, a memory-card, or other tangible medium capable of storing instructions. The instructions, when executed by computer, such as a server, cause the computer to execute a method for performing the function of one or more components and/or steps described above.

Although the invention is illustrated and described herein with reference to specific embodiments, the invention is not intended to be limited to the details shown. Rather, various modifications may be made in the details within the scope and range of equivalents of the claims and without departing from the invention.

We claim:

1. A method of providing trusted recommendations, comprising:
    establishing at least two categories stored in a first non-transitory processor readable medium associated with a network processor;
    receiving a recommendation request at the network processor requesting a recommendation in one of the at least two categories;
    returning, to a second non-transitory processor-readable medium associated with a remote processor from which the recommendation request was received, a recommendation of at least one established expert in the one of the at least two categories, wherein the recommendation is responsive to the recommendation request, and wherein the expert is established responsive to an indication from the remote processor; and
    returning, to the second non-transitory medium, of at least one further recommendation from at least one source trusted by the at least one established expert, wherein the at least one further recommendation is responsive to the recommendation request.

2. The method of claim 1, wherein the indication emanates from a mobile user who generated the recommendation request.

3. The method of claim 1, wherein the indication emanates from a plurality of third party users other than a user who generated the recommendation request.

4. The method of claim 1, further comprising returning to the second non-transitory medium of a recommendation rating from the established expert for the recommendation.

5. The method of claim 1, further comprising receiving a modification to a rating of the recommendation from the remote processor for storage at the first non-transitory medium.

6. The method of claim 1, wherein the one of the at least two categories is a food type.

7. The method of claim 1, wherein the one of the at least two categories is a drink type.

8. The method of claim 1, wherein the one of the at least two categories is child care.

9. The method of claim 1, wherein the one of the at least two categories is health care.

10. A method of receiving recommendations, comprising:
    sending a recommendation request to a computer-readable medium associated with a network processor, requesting a recommendation in one of at least two categories;

receiving, at a second non-transitory processor-readable medium associated with a sending processor from which the recommendation request was sent, a recommendation of at least one established expert in the one of the at least two categories, wherein the recommendation is responsive to the recommendation request, and wherein the expert is established responsive to an indication from the sending processor;

receiving, at the second non-transitory medium, of at least one further recommendation from at least one source trusted by the at least one established expert, wherein the at least one further recommendation is responsive to the recommendation request;

sending a first rating for at least one of the recommendation and the further recommendation from the sending processor;

sending a second rating for other than the recommendation and the further recommendation from the sending processor;

receiving an identification of a conflict indicated by comparing the first rating and the second rating;

soliciting feedback from a user of the sending processor to remedy the conflict; and adjusting by the sending processor of one of the first or second ratings responsive to the feedback.

11. The method of claim 10, wherein the indication emanates from a mobile user who generated the recommendation request.

12. The method of claim 10, wherein the indication emanates from a plurality of third party users other than a user who generated the recommendation request.

13. The method of claim 10, further comprising returning to the second non-transitory medium of a recommendation rating from the established expert for the recommendation.

14. The method of claim 10, further comprising receiving a modification to a rating of the recommendation from the remote processor for storage at the first non-transitory medium.

15. The method of claim 10, wherein the first rating is of a food type.

16. The method of claim 10, wherein the first rating is of a drink type.

* * * * *